US009454592B2

(12) United States Patent
Mills et al.

(10) Patent No.: US 9,454,592 B2
(45) Date of Patent: Sep. 27, 2016

(54) MANAGING, IMPORTING, AND EXPORTING TEAMSPACE TEMPLATES AND TEAMSPACES IN CONTENT REPOSITORIES

(71) Applicant: International Business Machines Corporation, Armonk, NY (US)

(72) Inventors: Scott P. Mills, Sammamish, WA (US); Michael J. Mitchell, Newnan, GA (US); Brett E. Morris, Arlington, VA (US)

(73) Assignee: International business Machines Corporation, Armonk, NY (US)

( * ) Notice: Subject to any disclaimer, the term of this patent is extended or adjusted under 35 U.S.C. 154(b) by 517 days.

(21) Appl. No.: 13/968,162

(22) Filed: Aug. 15, 2013

(65) Prior Publication Data

US 2014/0279880 A1    Sep. 18, 2014

Related U.S. Application Data

(63) Continuation-in-part of application No. 13/841,274, filed on Mar. 15, 2013.

(51) Int. Cl.
G06F 17/00 (2006.01)
G06F 17/30 (2006.01)

(52) U.S. Cl.
CPC .............. *G06F 17/30578* (2013.01)

(58) Field of Classification Search
CPC .......... G06F 17/30657; G06Q 10/103; G06Q 10/0631; G06Q 10/06311; G06Q 10/063112; G06Q 10/063114; G06Q 10/063116; G06Q 10/063118
See application file for complete search history.

(56) References Cited

U.S. PATENT DOCUMENTS

| | | | |
|---|---|---|---|
| 7,783,469 B2 | 8/2010 | Francis et al. | |
| 8,812,953 B2 * | 8/2014 | Estrada | G06F 17/3089 709/204 |
| 8,826,127 B2 * | 9/2014 | Estrada | G06F 17/30893 709/204 |
| 2003/0023677 A1 | 1/2003 | Zuill et al. | |
| 2004/0168084 A1 | 8/2004 | Owen et al. | |
| 2004/0236801 A1 | 11/2004 | Borden et al. | |
| 2005/0251502 A1 | 11/2005 | McCauley et al. | |
| 2006/0085245 A1 * | 4/2006 | Takatsuka | G06Q 10/0631 705/7.12 |
| 2007/0073673 A1 | 3/2007 | McVeigh et al. | |
| 2007/0226032 A1 * | 9/2007 | White | G06Q 10/101 705/300 |
| 2007/0239674 A1 | 10/2007 | Gorzela | |
| 2007/0282657 A1 * | 12/2007 | Hupfer | G06Q 10/06 705/7.15 |
| 2007/0283278 A1 | 12/2007 | Hupfer et al. | |
| 2008/0167840 A1 * | 7/2008 | Francis | G06Q 10/06 703/2 |
| 2009/0043851 A1 * | 2/2009 | Weir | G06Q 10/107 709/206 |
| 2009/0187832 A1 * | 7/2009 | Cheng | H04L 12/1822 715/757 |

(Continued)

OTHER PUBLICATIONS

Office Action, dated May 21, 2015 for U.S. Appl. No. 13/841,274 (54.100), filed Mar. 15, 2013, invented by Richard Howarth et al., Total 15 pages.

(Continued)

*Primary Examiner* — Cheryl Lewis
(74) *Attorney, Agent, or Firm* — Janaki K. Davda; Konrad, Raynes, Davda and Victor LLP

(57) ABSTRACT

Provided are techniques for managing, importing, and exporting teamspace templates and teamspaces in content repositories. A file is created using a teamspace template and associated metadata at a first content repository. The file is exported from the first content repository to a second content repository, wherein the file can be used to create a teamspace instance at the second content repository.

20 Claims, 26 Drawing Sheets

(56) References Cited

U.S. PATENT DOCUMENTS

| | | |
|---|---|---|
| 2009/0222382 A1 | 9/2009 | Kobza et al. |
| 2009/0234721 A1 | 9/2009 | Bigelow et al. |
| 2009/0260021 A1 | 10/2009 | Haenel et al. |
| 2009/0287684 A1 | 11/2009 | Bennett |
| 2010/0004941 A1 | 1/2010 | Chang et al. |
| 2012/0290351 A1 | 11/2012 | Bear et al. |
| 2014/0279880 A1* | 9/2014 | Mills ............ G06F 17/30578 707/613 |

OTHER PUBLICATIONS

Response to Office Action, dated Aug. 20, 2015, for U.S. Appl. No. 13/841,274 (54.100), filed Mar. 15, 2013, invented by Richard Howarth et al., Total 10 pages.

Anonymous; "Adaptable Content Retrieval for Cognitive Filtering of Sites and Content According to Job Role Skill Set Taxonomy", available at <URL: http://priorartdatabase.com/IPCOM/000219548>, Jul. 5, 2012, Total 4 pp.

Anonymous, "Dynamic Role-Based Authorization System and Method", available at <URL: http://www.ip.com/pubview/IPCOM000132142D>, Dec. 2, 2005, Total 23 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Petitpierre, C., "Bottom Up Creation of a DSL Using Templates and JSON", Oct. 23-24, 2011, SPLASH' 11 Workshops, ACM, Portland Oregon, Total 6 pp.

Anonymous, "System and Method for Task Model Based Runtime Human Team Retrieval", available at <URL: http://ip.com/IPCOM/000225677>, Feb. 26, 2013, Total 4 pp.

Zhu, W., R. Bacalzo, E. Edeen, Y. Jun, D. Ouimet, J.D. Schmitt, B. Wang, D. Wersin, D.B. Werts, and M. Willingham, "Federated Content Management—Accessing Content from Disparate Repositories with IBM Content Federation Services and IBM Content Integrator", Redbooks, retrieved from the Internet at <URL: http://www.ibm.com/redbooks/sg247742-00>, IBM Corporation, Apr. 2010, Total 564 pp.

USPTO Patent Application, dated Mar. 13, 2013, for U.S. Appl. No. 13/841,274, filed Mar. 13, 2013, entitled "Self Provisioning and Applying Role-Based Security to Teamspaces in Content Repositories", invented by Scott P. Mills et al., pp. 1-45.

Notice of Allowance, dated Sep. 25, 2015, for U.S. Appl. No. 13/841,274 (54.100), filed Mar. 15, 2013, invented by Richard Howarth et al., Total 8 pages.

* cited by examiner

FIG. 10

Teamspace Template Builder

[Previous] [Next] [Finish] [Cancel]

Define Teamspace Template
Select Searches
Select Classes or Entry Templates
Include Folders and Documents
Select Roles

Select Searches

Include searches that will enable teamspace users to complete tasks more efficiently. If no searches are included, teamspace users will see all of the searches to which they have permission. Users can also add and share searches in the teamspace with the appropriate permissions. Learn more

Selected searches:

[Remove]  [New Search...]

| Search Name | Description |
|---|---|
| Contracts by Law Firm — 1002 | Contracts by Law Firm |
| Contracts by Sector — 1004 | |

[Add]

Available searches: [Filter]

| Search Name | Description |
|---|---|
| All General Documents | |
| All Invoices | |
| Contract by contract number | |
| Contracts by Law Firm | Contracts by Law firm |
| Contracts by Law Firm and Sector | |

Teamspace Template Builder

[Previous] [Next] [Finish] [Cancel]

Define Teamspace Template
Select Searches
Select Classes or Entry Templates
Include Folders and Documents
Select Roles

Select Classes or Entry Templates

Specify whether the teamspaces that are created from this template will use classes or entry templates to add documents to the repository. If no classes are selected, teamspaces will see all of the classes to which they have access. User can modify the list of classes or entry templates in the teamspace if they have the appropriate permission.

⦿ Use classes to add documents  ○ Use entry templates to add documents

Selected classes: —— 1102

[Remove] [Make Default]

| Default | Class Name |
|---------|------------|
| Default | Contract |
|         | General Documents |

[Add]

Available classes:
▸ Document
  ▸ Business Documents
  ▸ Photos

Teamspace Template Builder

[Previous] [Next] [Finish] [Cancel]

- Define Teamspace Template
- Select Searches
- Select Classes or Entry Templates
- Include Folders and Documents
- Select Roles

Select Roles

Specify the roles that will be included in every teamspace that is created from this template. You can also create new roles, which you can use when you create other teamspace templates. Users cannot modify the roles or list of roles when they create a teamspace. Learn more

Selected roles:

[Remove] [Edit]                                              [Make Available] [New Role...] — 1304

| Role Name | Description |
|---|---|
| Owner | Assign this role to users who need to manage the teamspace, including access to the teamspace. |
| Member — 1302 | Assign this role to users who need to be able to modify the contents of the teamspace. |
| Reviewer | Assign this role to users who need to view the contents of the teamspace. |

[Add]

Available roles:                                              [Filter]

| Role Name | Description |
|---|---|
| Owner | Assign this role to users who need to manage the teamspace, including access to the teamspace. |
| Member | Assign this role to users who need to be able to modify the contents of the teamspace. |
| Reviewer | Assign this role to users who need to view the contents of the teamspace. |

Permissions for the Member role:

Document and Folder permissions:

| Permission |
|---|
| ☐ Manage permissions |
| ☐ Delete |
| ☑ Promote versions |
| ☑ Edit documents |
| ☑ Edit properties |
| ☑ Create subfolders |
| ☑ Add to folders |
| ☑ View documents |
| ☑ View properties |

Teamspace permissions:

| |
|---|
| ☐ Add searches |
| ☐ Manage classes or entry templates |
| ☐ Manage teamspace users |

Ning – CM8 – nondefault se ▼

Teamspaces | Templates

Refresh | New Template | Export | Import | Actions ▼

— 1610   — 1620

0614.001
Modified By VTUSER02 | Modified On 5/25/2011, 4:29 PM | Status: Available Import dirty 3
Used for testing import
Modified By ICMADMIN | Modified On 6/08/2011, 10:44 PM | Status: Requires validation  ← 1910

Mary R2 Security Template
shared with icmadmin, nexus & vtuser01
Modified By NXSADMIN | Modified On 5/25/2011, 1:31 PM | Status: Available icn201.000.001
Modified By ICMADMIN | Modified On 5/20/2011, 7:00 PM | Status: Available icn202.270
Modified By ICMADMIN | Modified On 6/8/2011, 6:41 AM | Status: Available icn202.270.newRole
Modified By ICMADMIN | Modified On 6/8/2011, 3:56 PM | Status: Available

1900

1600

MANAGING, IMPORTING, AND EXPORTING TEAMSPACE TEMPLATES AND TEAMSPACES IN CONTENT REPOSITORIES

CROSS-REFERENCE TO RELATED APPLICATION

This application is a continuation-in-part application and claims the benefit of U.S. application Ser. No. 13/841,274, filed Mar. 15, 2013, and the entire contents of this application are incorporated herein by reference.

FIELD

Embodiments of the invention relate to managing, importing, and exporting teamspace templates and teamspaces in content repositories.

BACKGROUND

A content management system enables management of content in a content repository. A teamspace (also referred as a project area) may include folders, documents, and other artifacts (content) within a content repository. Typically, a system administrator provisions a teamspace to a team of people for use in their collaboration on a project.

SUMMARY

Provided are a method, computer program product, and computer system for managing, importing, and exporting teamspace templates and teamspaces in content repositories. A file is created using a teamspace template and associated metadata at a first content repository. The file is exported from the first content repository to a second content repository, wherein the file can be used to create a teamspace instance at the second content repository.

BRIEF DESCRIPTION OF THE SEVERAL VIEWS OF THE DRAWINGS

Referring now to the drawings in which like reference numbers represent corresponding parts throughout:

FIG. 10 illustrates a user interface for selecting searches in accordance with certain embodiments.

FIG. 11 illustrates a user interface for selecting classes or entry templates in accordance with certain embodiments.

FIG. 13 illustrates a user interface for predefining roles in accordance with certain embodiments.

FIG. 19 illustrates a user interface after a file has been imported in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
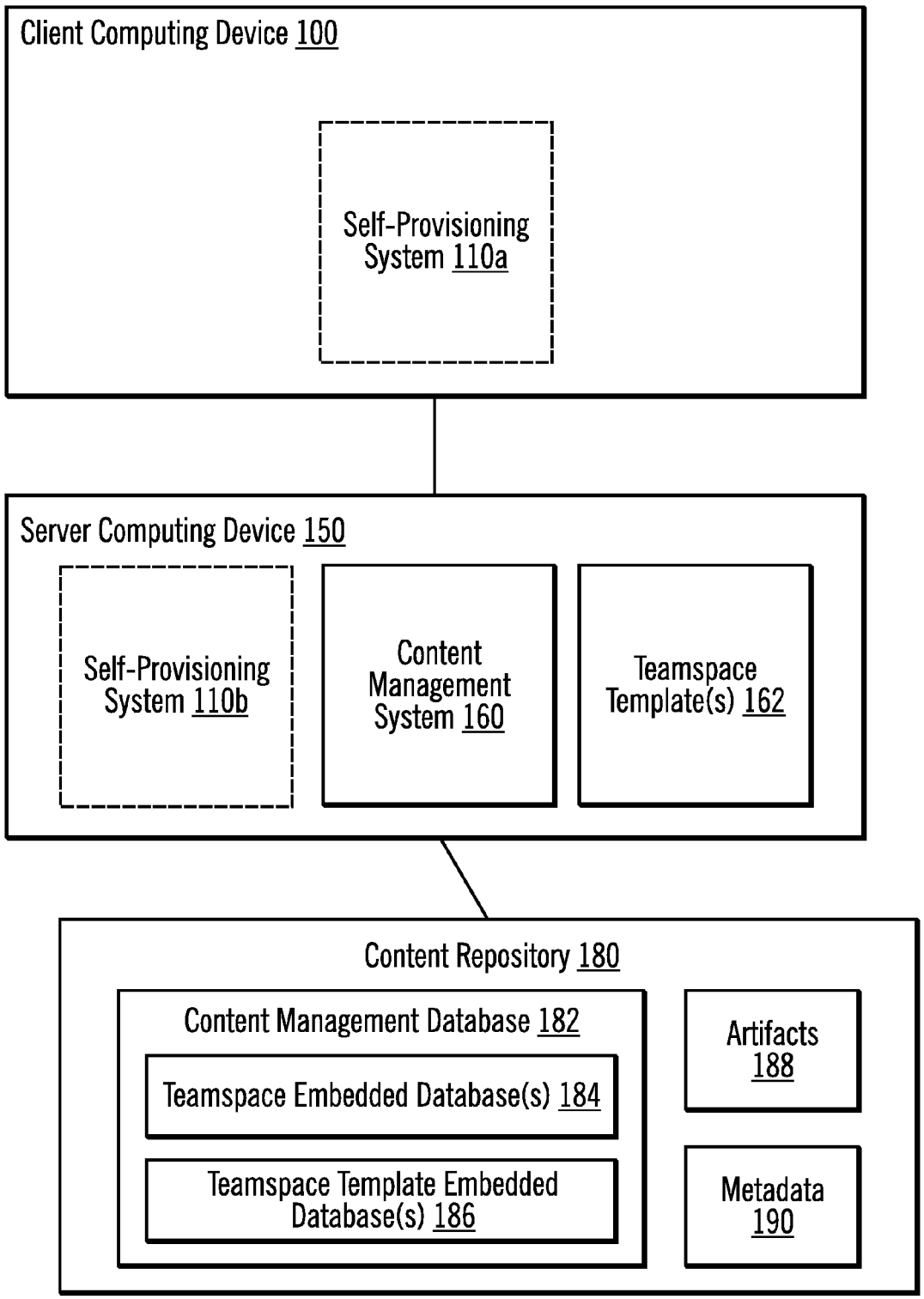
FIG. 1 illustrates a computing environment in accordance with certain embodiments.

FIG. 1 illustrates a computing environment in accordance with certain embodiments. In FIG. 1, a client computing device 100 is coupled to a server computing device 150. The client computing device 100 includes a self-provisioning system 110a. The server computing device 150 includes a self-provisioning system 110b, a content management system 160, and one or more teamspace templates 162. In certain embodiments, the self-provisioning system provided by embodiments includes a client-side self-provisioning system 110a and a server-side self-provisioning system 110b that work together.

The server computing device 150 is coupled to a content repository 180. The content repository 180 includes a content management database 182, artifacts 188 (also referred to as content), and metadata 190. The artifacts may include, for example, folders, documents, classes, entry templates, searches, and roles. The content management database 182 may store metadata 190 about artifacts 188. The artifacts 188 may include, for example, documents, images, e-mails, etc. The content management system 160 manages the artifacts 188 in the content management database 182. The content management database 182 includes metadata that provides structure around unstructured artifacts 188 that a user adds to the content management system 160. The content management database 182 also provides the security and classification of the managed artifacts 188. With embodiments, the content management database 182 also includes one or more teamspace embedded databases 184 and one or more teamspace template embedded databases 186.

In certain embodiments, an embedded database may be described as a teamspace instance definition (for a teamspace embedded database 184) or a teamspace template definition (for a teamspace template embedded database 186). The embedded database defines the scope of what artifacts are contained in the teamspace, what artifacts can be added to the teamspace, and what role-based security is applied to the teamspace. A teamspace instance may be described as defining a working teamspace, which includes both existing and new artifacts created by team members using the teamspace. Team membership role-based security is applied to the teamspace instance.

The self-provisioning system 110a allows organizations to develop teamspace templates that describe the manner in which business users will generate teamspaces. A teamspace template is used to accelerate the business user's ability to self-provision teamspaces.

A teamspace may consist of folder structures, secured by user-defined role-based security definitions, as well as, a descriptor. A folder structure may be described as identifying folders for storing the documents and providing a relationship between the folders (e.g., a hierarchical relationship between the folders). The descriptor may designate how users are to: add, edit, view, and approve documents; search and view activities inside the team space and the life cycle governance policy for the teamspace. To allow for simplified role-based security setup, embodiments provide a new mechanism for generating roles and mapping users and groups to roles. The role-based security model provides a customizable technique for determining access rights to teamspaces.

With embodiments, when the content repository 180 is provisioned, a new database is embedded within the content management database 182. In certain embodiments, the embedded database may be implemented using a file based database (e.g., JavaScript® Object Notation (JSON), JavaScript® is a trademark of Oracle Corporation in the United States, other countries, or both). In certain embodiments, the embedded database is stored in a table of the content management database 182 as a Binary Large Object (BLOB) field or Character Large Object (CLOB) field. In certain embodiments, unique identifiers (IDs) of items that are provisioned are added to the embedded database. Hence, whenever new artifacts are added to a teamspace, the artifacts are stored in the content management database 182, and the unique IDs of the items are added to the teamspace embedded database 184.

In certain embodiments, the teamspace embedded database 184 is managed independently of the content management database 182, therefore non-administrative content management users may create and control access to the teamspace.

In certain embodiments, a separate table in the content management database 182 is used to store a list of roles that may be applied to a teamspace. Each role contains one or more permissions that may be granted to users of a teamspace. When a teamspace is created, each user is assigned zero or more roles that define what access permissions the user will have. This process creates an Access Control List (ACL) for each teamspace. This ACL maps the permissions assigned by the roles to the underlying content management security permissions. The mapping controls which actions may be performed on items in the teamspace and the teamspace itself. In certain embodiments, when new artifacts (e.g., documents or folders) are added, the new artifacts (e.g., the documents or folders) inherit the security of the teamspace.

Teamspace templates may be stored in an embedded database similar to teamspaces. However, the teamspace template embedded databases 186 may be stored in a separate table from the teamspace embedded databases 184 so that access control for who can create teamspace templates may be managed independently of access control for who can create teamspaces. Thus, a user who has permission to create teamspaces may not have permission to create teamspace templates. When a teamspace template is used to create a teamspace, a copy of the teamspace template embedded database is retrieved and used to create the teamspace embedded database. In certain embodiments, the teamspace template embedded database provided by the teamspace template is the base for what is generated to create the teamspace instance. A teamspace may extend or change certain aspects of the teamspace template embedded database provided by the teamspace template, but the teamspace uses the teamspace template embedded database as the starting point. The teamspace template embedded database provides the roles that are used to apply the role-based security on the teamspace instance, and the teamspace template also contains the role definitions.

Once the teamspace is created, users that are assigned to the ACL have the ability to retrieve and work with data within the teamspace.

Figure 2:
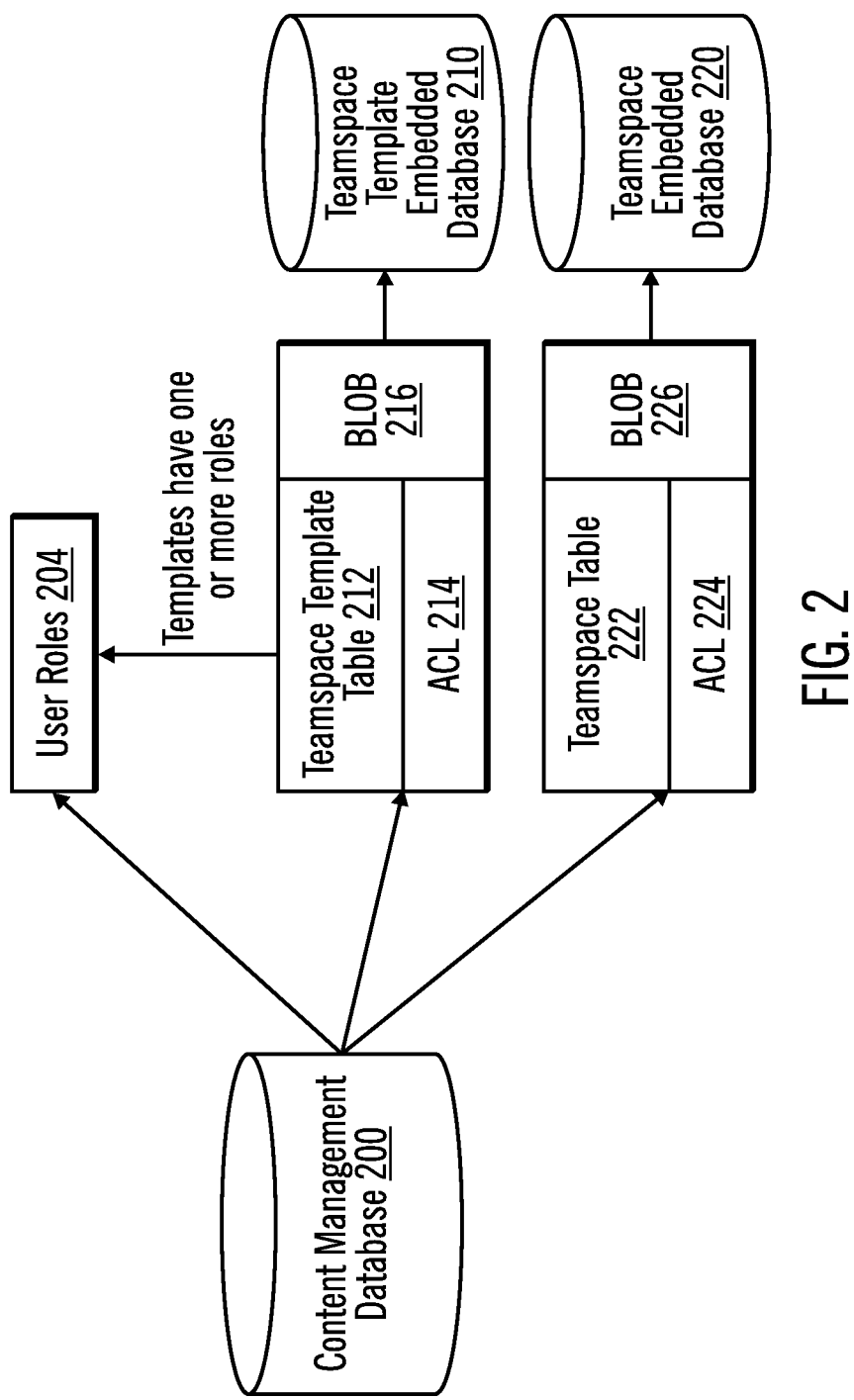
FIG. 2 illustrates embedded databases in accordance with certain embodiments.

FIG. 2 illustrates embedded databases in accordance with certain embodiments. In FIG. 2, a content management database 200 stores user roles 204, a teamspace template table 212, and a teamspace table 222. The teamspace template table is associated with an ACL 214 and a BLOB 216 to form a teamspace template embedded database 210. The teamspace table 222 is associated with an ACL 224 and a BLOB 226 to form a teamspace embedded database 220.

Figure 3:
FIG. 3 illustrates a roles table in accordance with certain embodiments.

FIG. 3 illustrates a roles table 300 in accordance with certain embodiments. The roles table 300 includes columns for: name, description, and permissions (privileges). The name is the identifier of a role. The description describes the purpose of the role. The permissions are a collection of teamspace access rights. These teamspace access rights include, for example, the ability create and remove artifacts (e.g., content) from the teamspace.

Figure 4:
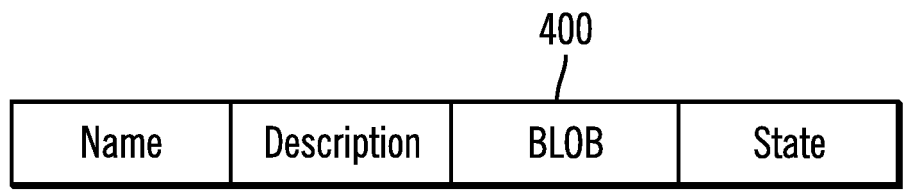
FIG. 4 illustrates a table for a teamspace template or a teamspace in accordance with certain embodiments.

FIG. 4 illustrates a table 400 for a teamspace template or a teamspace in accordance with certain embodiments. Table 400 includes columns for: a name, a description, a BLOB, and state. The name is either the name of a teamspace template or the name of a teamspace instance. The description describes the purpose of either the teamspace template or the teamspace instance. The BLOB represents the embedded database of the teamspace template or the teamspace instance. The state describes the state of either the teamspace template or the teamspace instance. Examples of valid states include, requires validation, offline, published, deleted, archived, etc.

Figure 5A:
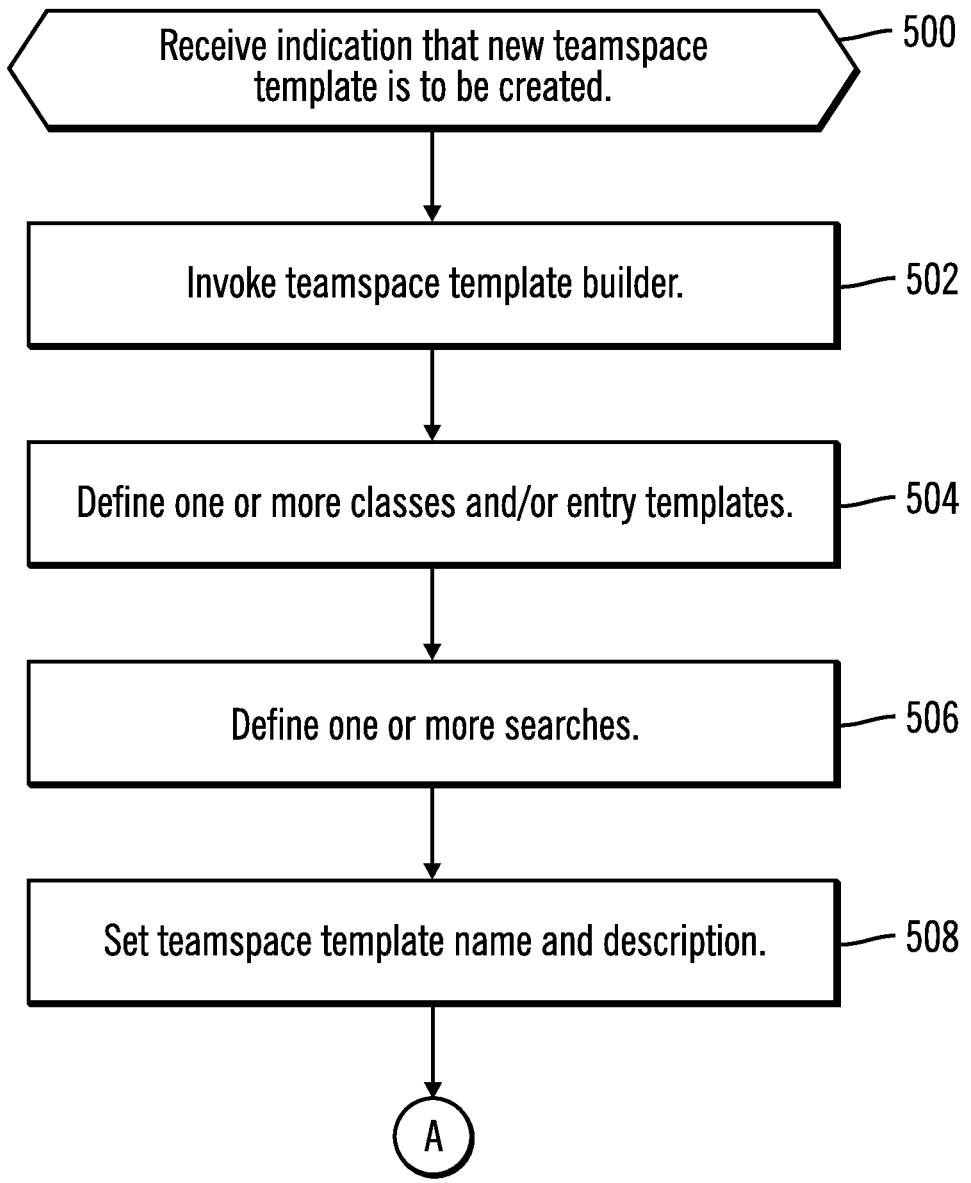
FIGS. 5A and 5B illustrate, in a flow diagram, operations to create a teamspace template in accordance with certain embodiments.
Figure 5B:
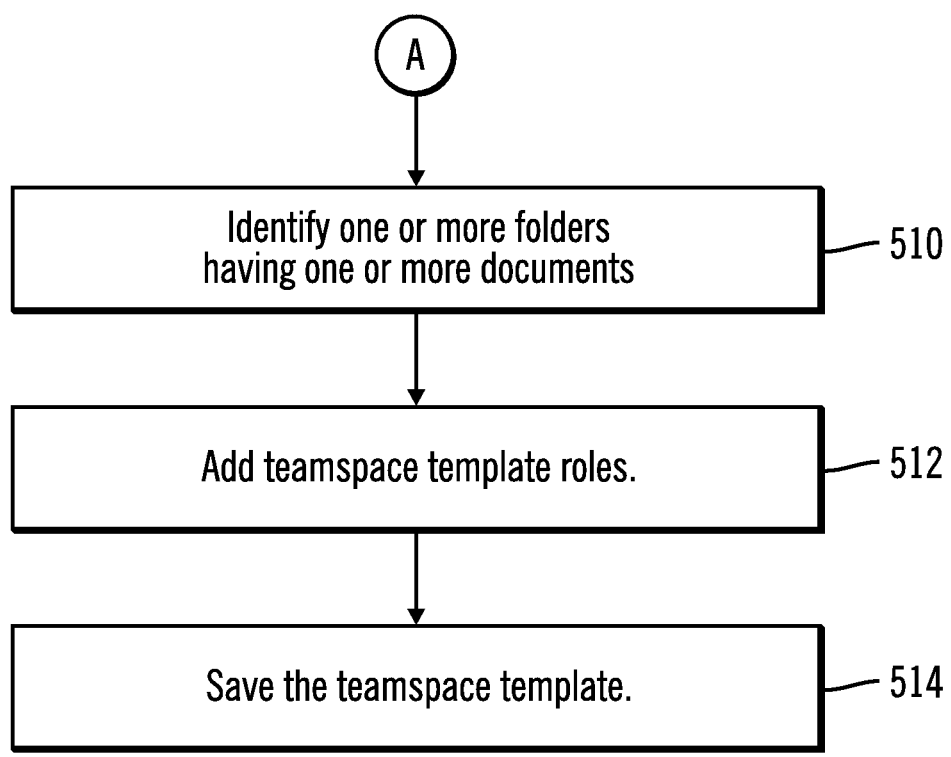

FIGS. 5A and 5B illustrate, in a flow diagram, operations to create a teamspace template in accordance with certain embodiments.

In certain embodiments, self-provisioning system 110a and self-provisioning system 110b work together to perform the processing of FIGS. 5A and 5B. In certain embodiments, the self-provisioning system 110a prompts the user for template definition input and gathers the user's responses, which are then used to fill out the teamspace template definition 110b, which is then persisted by self-provisioning system 110b to content repository 180.

Control begins at block 500 with the self-provisioning system 110a receiving an indication that a new teamspace template is to be created. In block 502, the self-provisioning system 110a invokes a teamspace template builder. In block 504, the self-provisioning system 110a defines one or more classes and/or entry templates. The classes and entry templates may be described as teamspace characteristics. In block 506, the self-provisioning system 110a defines one or more searches. The teamspace template searches are predefined queries.

In block 508, the self-provisioning system 110a sets the teamspace template name and description. From block 508 (FIG. 5A), processing continues to block 510 (FIG. 5B).

In block 510, the self-provisioning system 110a identifies one or more folders having one or more documents. The folders and documents may be described as teamspace characteristics. Part of the processing of block 510 sets up rules for where documents are to be contained or referenced within the teamspace. In block 512, the self-provisioning system 110a adds teamspace template roles. In block 514, the self-provisioning system 110a and self-provisioning system 110b save the teamspace template.

Figure 6A:
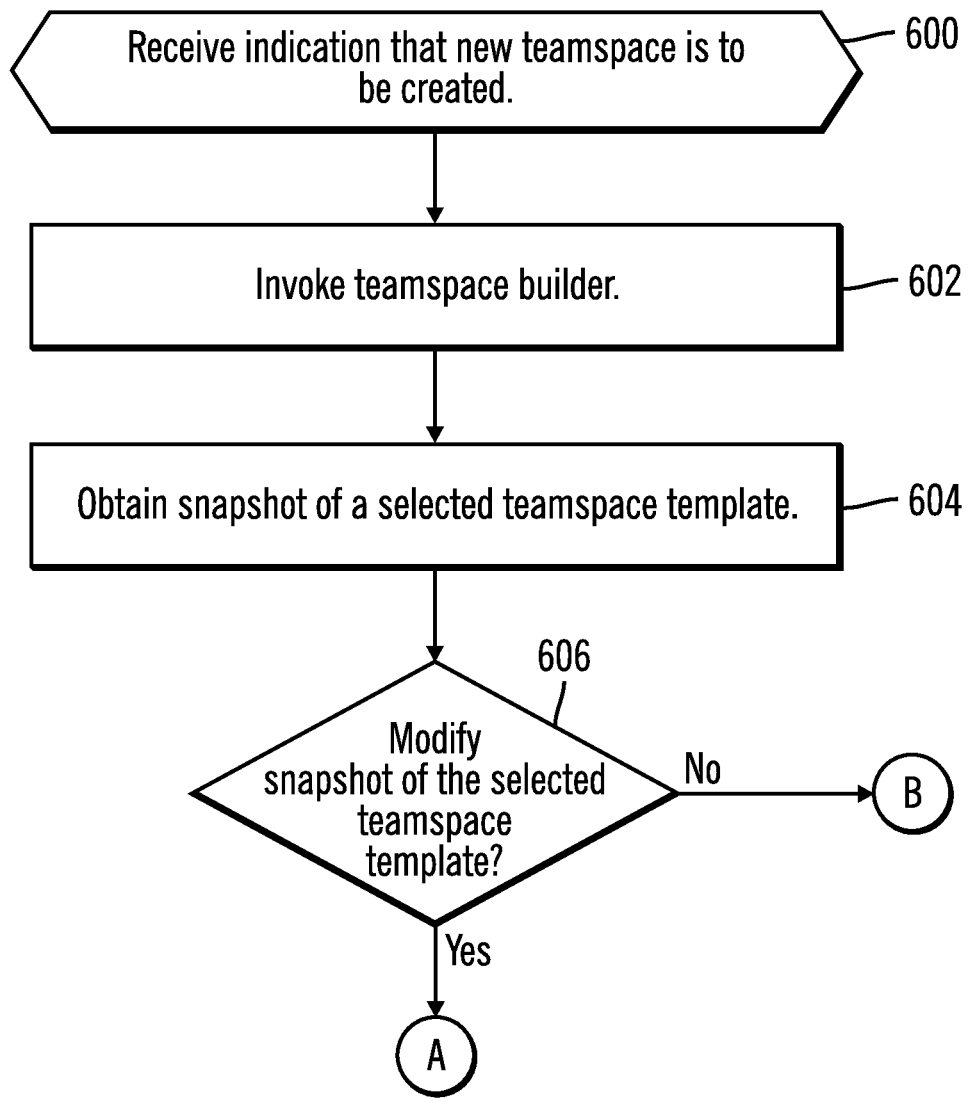
FIGS. 6A and 6B illustrate, in a flow diagram, operations to create a teamspace in accordance with certain embodiments.
Figure 6B:
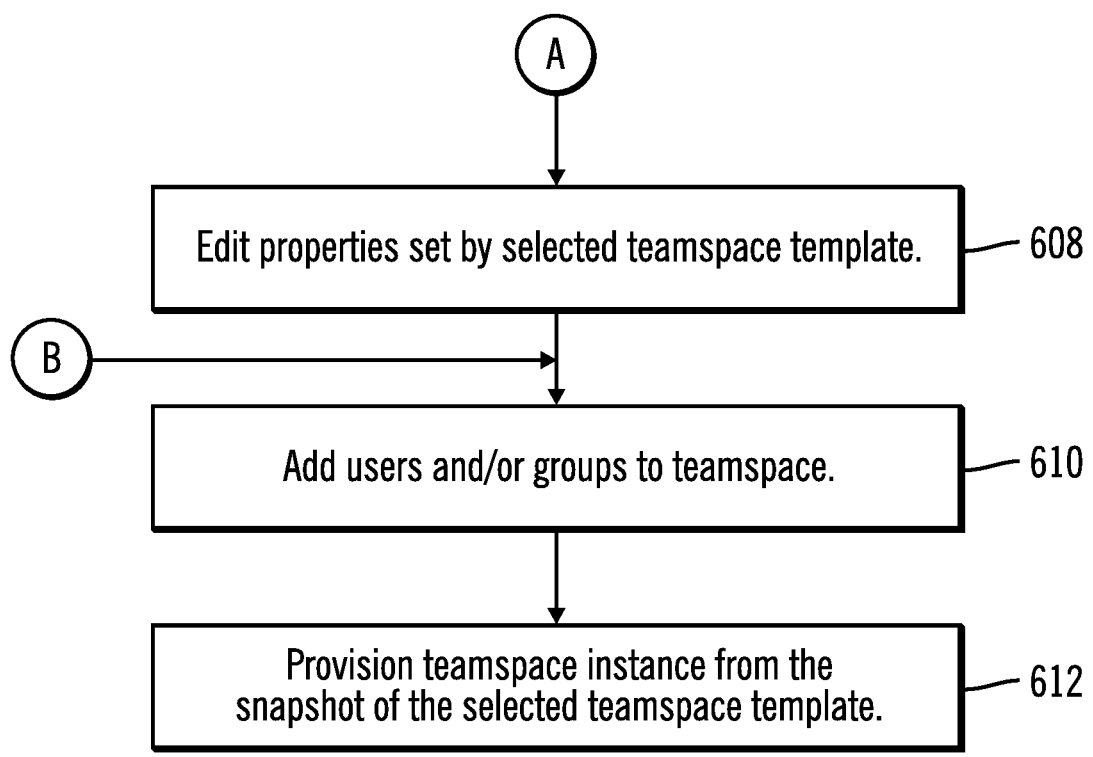

FIGS. 6A and 6B illustrate, in a flow diagram, operations to create a teamspace in accordance with certain embodiments. Creation of a teamspace may also be referred to as creation of a teamspace instance. Control begins at block 600 with the self-provisioning system 110a receiving an indication that a new teamspace is to be created. In block 602, the self-provisioning system 110a invokes a teamspace template builder.

In block 604, the self-provisioning system 110a obtains a snapshot of a selected teamspace template. In certain embodiments, the self-provisioning system 110a generates the snapshot. The teamspace instance may be generated at any time after the processing of block 604 (in which the snapshot is obtained). Optionally, the snapshot may be modified. In certain embodiments, a snapshot may be described as representing the teamspace template definition plus any changes or additions the end user makes to the teamspace template definition in the teamspace template builder during the self-provisioning process (e.g., adding/removing reference searches, adding/removing folders and documents, adding team members and assigning them to the team roles (defined by the teamspace template definition), etc.).

In block 606, the self-provisioning system 110a determines whether the snapshot of the selected teamspace template is to be modified. In certain embodiments, the user determines whether to change a snapshot of the teamspace template. However, the actual teamspace template definition is not changed. In certain embodiments, a snapshot of the teamspace template is used as a starting point to generate a teamspace instance. If so, processing continues to block 608 (FIG. 6B), otherwise, processing continues to block 610 (FIG. 6B). In block 608, the self-provisioning system 110a edits properties set by the selected teamspace template. In block 610, the self-provisioning system 110a adds users and/or groups to the teamspace. The users and/or groups map to the roles defined for the teamspace template. In certain embodiments, the user defining the teamspace instance, from the teamspace template snapshot, may map users and groups to the roles defined by the teamspace template. In block 612, the self-provisioning system 110a creates the teamspace instance from the snapshot of the selected teamspace template.

Figure 7:
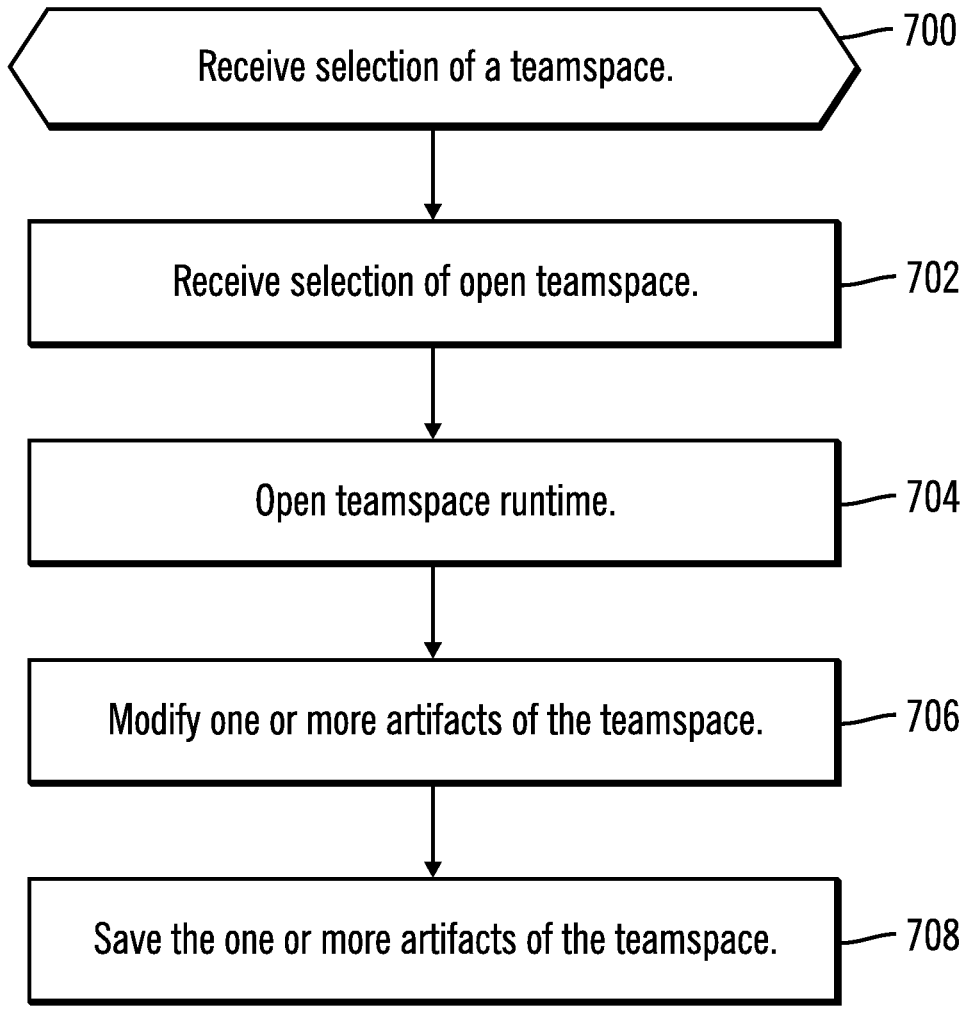
FIG. 7 illustrates, in a flow diagram, operations to create a runtime teamspace in accordance with certain embodiments.

FIG. 7 illustrates, in a flow diagram, operations to create a runtime teamspace in accordance with certain embodiments. Control begins at block 700 with the self-provisioning system 110a receiving selection of a teamspace (e.g., from a list of teamspaces). In block 702, the self-provisioning system 110a receives selection of "open" teamspace (e.g., via selection of an open teamspace button, command, or menu). In block 704, the self-provisioning system 110a opens a teamspace runtime. Opening a teamspace runtime may be described as a retrieval of the teamspace instance definition, objects referenced in the teamspace embedded database, and the list of team members (users and groups granted access to the teamspace). In block 706, the self-provisioning system 110a modifies one or more artifacts (e.g., the content) of the teamspace. Modifying the one or more artifacts includes adding artifacts, deleting artifacts and/or updating artifacts.

In block 708, the self-provisioning system 110a saves the one or more artifacts of the teamspace. In certain embodiments, users with appropriate authority may optionally edit the teamspace embedded database, but general runtime changes to documents and folders within the teamspace do not change the teamspace embedded database.

FIGS. 8-13 describe a business use case in which an administrator or business analyst defines a contract teamspace template that captures a typical set of artifacts that a set of end users may leverage in creating a new contract. The contract teamspace template is selected by the end user to stream line the self-provisioning of a teamspace instance in the content management database.

Figure 8:
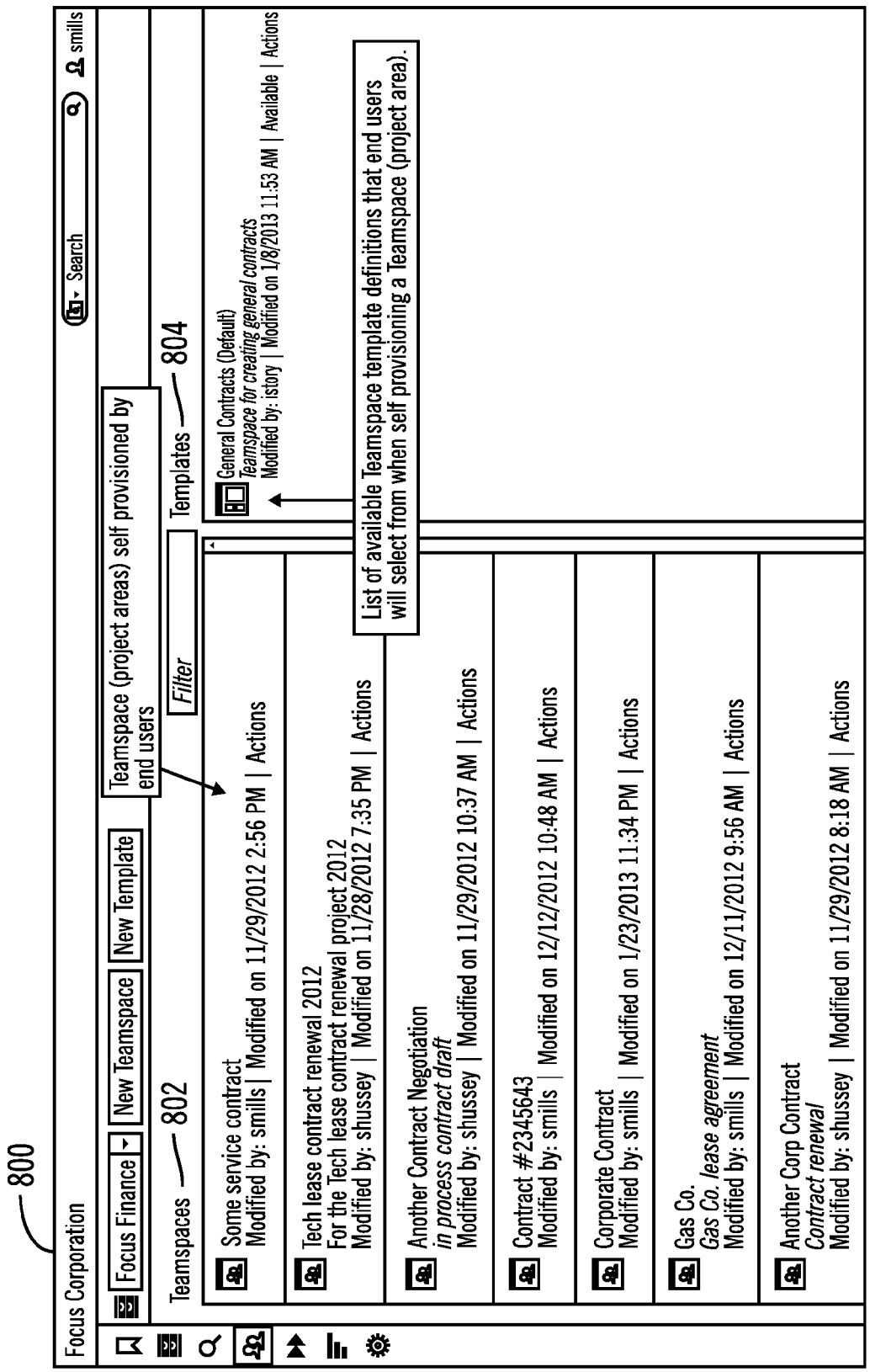
FIG. 8 illustrates a user interface for a client interface of a teamspace template builder in accordance with certain embodiments.

FIG. 8 illustrates a user interface 800 for a client interface of a teamspace template builder in accordance with certain embodiments. The user interface 800 shows teamspaces 802 and templates 804. The templates 804 include a contract teamspace template (labeled "General Contracts").

FIGS. 9-13 illustrate how the contract teamspace template was created in accordance with certain embodiments.

Figure 9:
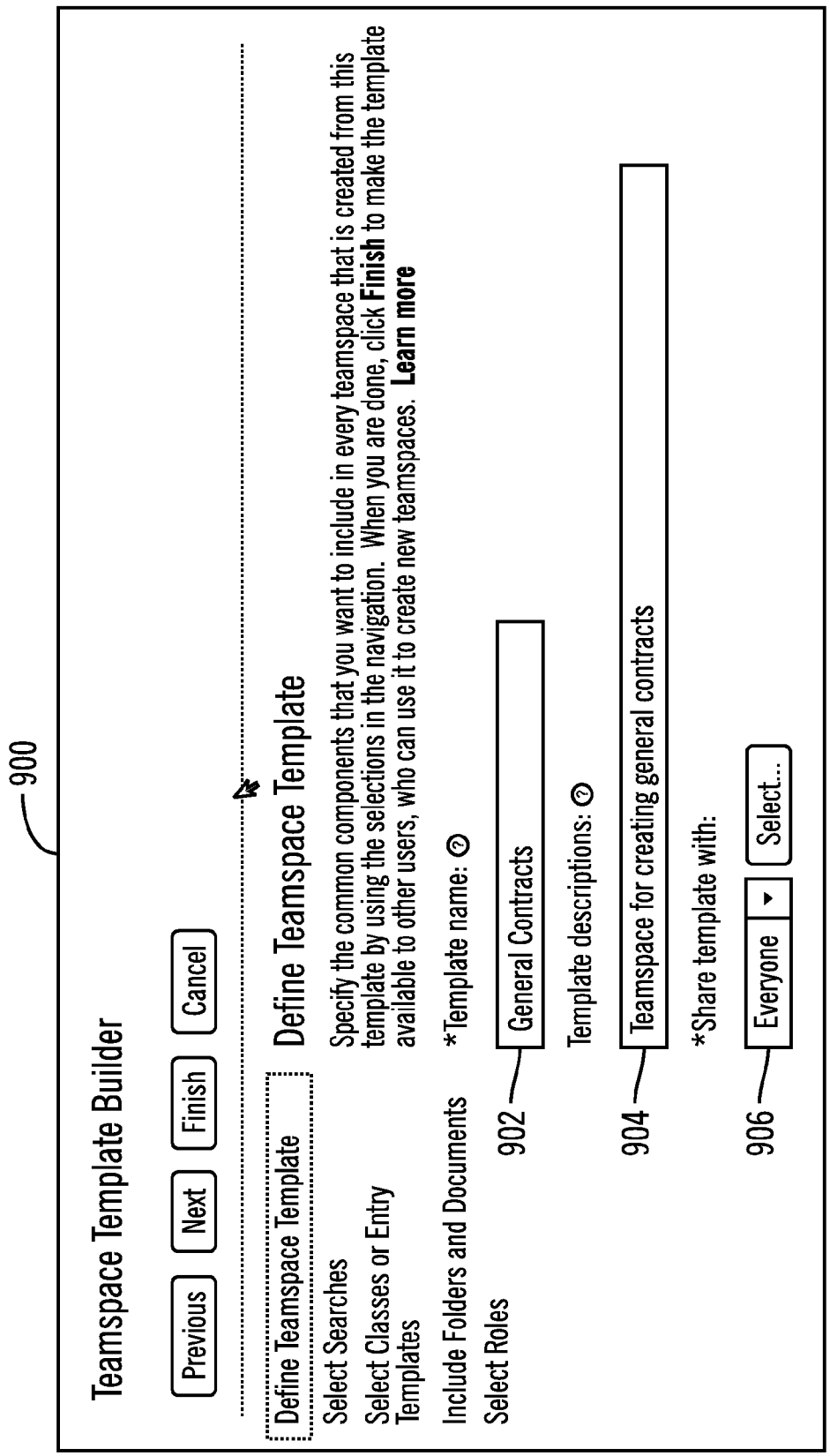
FIG. 9 illustrates a user interface for a teamspace template builder for defining a contract teamspace template in accordance with certain embodiments.

FIG. 9 illustrates a user interface 900 for a teamspace template builder for defining a contract teamspace template in accordance with certain embodiments. In user interface 900, a user may enter the following: a teamspace template name 902, a template description 904, and who may share the template 906 (e.g., who has access to use the template for creating a teamspace instance). In this example, everyone has access to select this template when creating a teamspace instance. Alternatively, a set of users and/or groups may have been identified to have access to this teamspace template.

FIG. 10 illustrates a user interface 1000 for selecting searches in accordance with certain embodiments. With user interface 1000, a user may select searches (e.g., queries) that are to be part of the teamspace template definitions. Predefined searches may be objects managed in the content repository. The searches are used to return documents or folders that help the end user complete tasks. In the example of the contract teamspace template, the searches referenced return contract documents created by a specific law firm (e.g., search name "Contracts by Law Firm" 1002) or a specific industry sector (e.g., search name "Contracts by Sector" 1004).

FIG. 11 illustrates a user interface 1100 for selecting classes or entry templates in accordance with certain embodiments. The classes and/or entry templates are used to index new documents (e.g., contracts) when the new documents are added to the teamspace. User interface 1100 identifies selected classes 1102.

Classes categorize the type of document being added. A class references properties that further classify what type of document is being added (Property examples of a contract include, for example: document title, authoring division, type of document (long term, short term, lease, etc.), review status, governing law, parties, sector, contract number, etc.). Entry templates may be used to stream line the add/check-in behavior of a document. An entry template defines what class is going to be used, predefines the property behavior on the class (e.g. the order the properties are presented to the end user, hide specific properties of the class, mark certain properties as read only or required, provide default values, etc.). An entry template may also define default security on a document and define if/how/when a document might be routed for approval/review.

Figure 12:
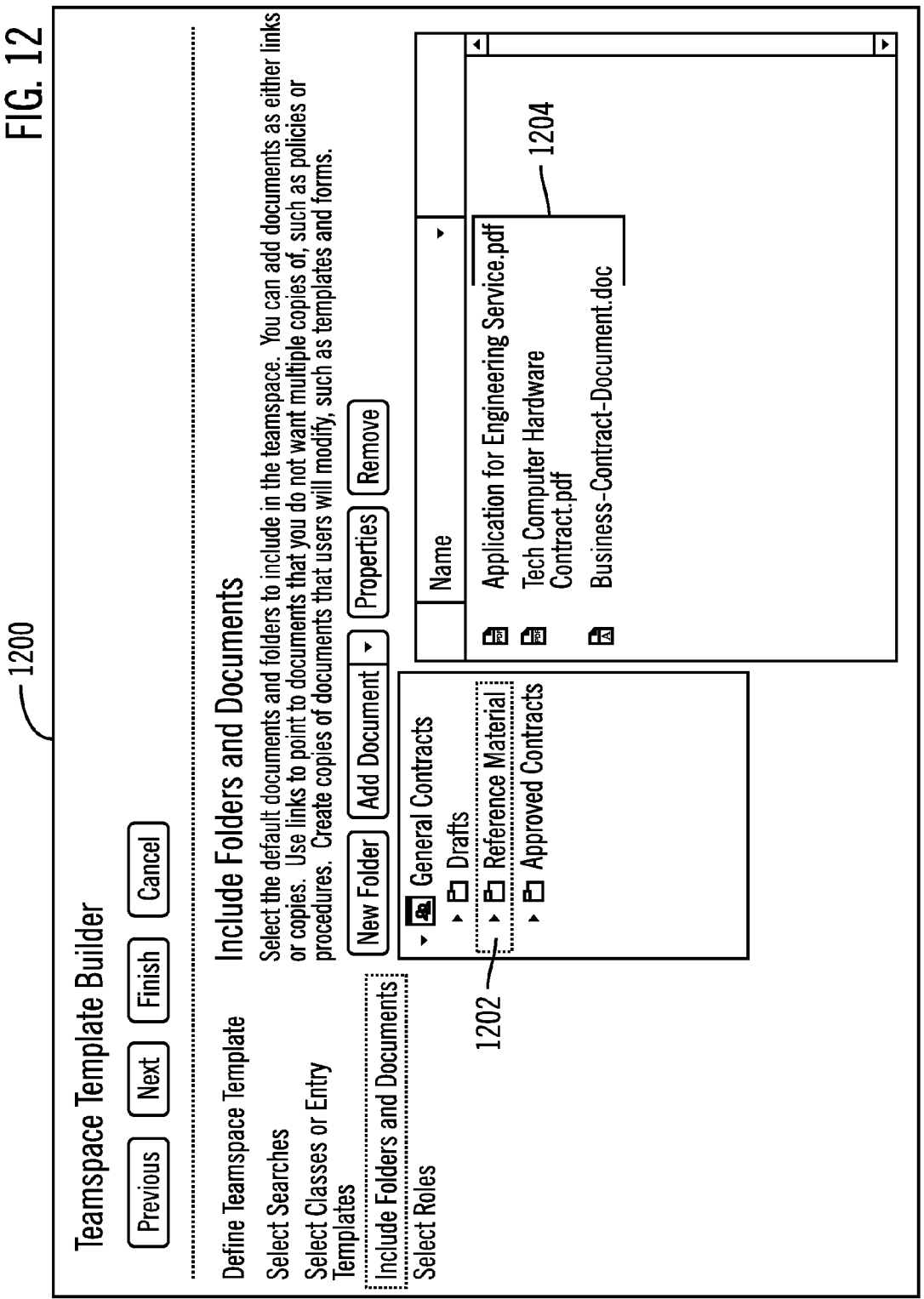
FIG. 12 illustrates a user interface for selection of folders and documents in accordance with certain embodiments.

FIG. 12 illustrates a user interface 1200 for selection of folders and documents in accordance with certain embodiments. In user interface 1200, a Reference Material folder 1202 has documents 1204. As part of the contract teamspace template definition, a user can predefine the folder structure on how documents will be managed in the teamspace. In addition the user has the ability to pre-reference what documents are available in the teamspace when the teamspace is provisioned by the end user. As part of the document reference definition, the user can specify whether a copy of the document is created for each new teamspace created or whether a link to the same document is used for each new teamspace instance. For the contract scenario, a copy of a text document (that represents a contract template) may be created for each teamspace instance, and then there may be links to desktop procedures/requirements on what should be covered in a typical contract.

FIG. 13 illustrates a user interface 1300 for predefining roles in accordance with certain embodiments. The teamspace template builder allows a user to predefine a set of user roles and map what permissions are available for a given user role. As part of the self-provisioning or once the teamspace has been created, the end user can add and remove users/groups to these predefined roles. For the contract template, there are three roles defined; Owner role (which maps maximum permissions), Member role (maps author and view based permissions), and Reviewer role (maps view based permissions). In FIG. 13, for Member 1302, permissions 1304 are shown.

Through the use of teamspace templates and role-based security, a teamspace may be provisioned and managed by non-administrative end users. Teamspace templates separate the design of teamspaces, and the rights to do so, from the right to provision a teamspace. With embodiments, role-based security is implemented on top of ACL based security provided by the content repository. The use of role-based security in teamspaces gives end users the ability to apply security in a way that they can easily understand, while not losing the power of the security model provided by the underlying repositories. Furthermore, role based security may be implemented on different repositories with different underlying security mechanisms, but embodiments provide end users with an equivalent user experience.

Embodiments enable a content management application to self-provision teamspaces so business users can quickly bring a team together that grants them access to a teamspace within the scope of a larger content repository. Embodiments provide customers with the ability to empower their line of business users to create and manage their own teamspaces without involving their Information Technology (IT) department, while retaining, archiving, and disposing of artifacts created in these teamspaces. Embodiments enable business users to organize folders, perform searches, route documents for approval, and manage artifacts (e.g., images and documents). With embodiments, self provisioning enables business users to apply role-based security to their own teamspaces in a controlled manner.

In certain embodiments, a content space (e.g., a teamspace) is provisioned by selecting a set of content space characteristics, generating one or more user roles with associated permissions, generating a template including the content space characteristics and the user roles, and provisioning the content space based on the template. The content space characteristics may include one or more of: one or more content object types, one or more content folders, and zero or more artifacts within the content folders. The content space characteristics may be defined in one or more content management systems.

Managing, Importing, and Exporting Teamspaces

Thus, embodiments allow a content management system 160 to self-provision teamspaces so that business users can quickly bring a team together that grants them access to a teamspace within the scope of the larger enterprise content repository. Thus, users may create and manage their own teamspaces without involving their Information Technology (IT) department.

IT departments provide corporate policy guidance/guidelines on how artifacts created in these teamspaces are reviewed/approved, what life cycle actions are applied, etc. These policy rules/guidelines may be updated and applied to existing self-provision projects, as well as, migrated to other content repositories. In addition, as these self-provision projects end their life cycle, embodiments allow decommissioning these teamspaces, which requires rules on how teamspace artifacts are subsequently managed (e.g. are the artifacts deleted, published/repurposed, archived, compliance managed, defensively disposed, etc.).

Embodiments build on teamspace templates to allow organizations to develop teamspace templates that describe the manner in which business users generate teamspaces. The teamspace template is used to accelerate the business user's ability to self-provision teamspaces and to provide corporate policy guidance/guidelines in the area of: review/approve workflow patterns, life cycle actions applied to the artifacts, how the teamspace is decommissioned, and how the artifacts are managed during the decommissioning phase of the teamspace. As policies, rules, and guidelines change, these changes are updated in the teamspace templates, which are then applied to new self-provisioned teamspaces and, optionally, applied to existing self provisioned teamspaces. In addition these teamspace templates may be exported and imported to other repositories.

In embodiments, decomposition rules and/or life cycle rules may be associated with teamspace templates and/or teamspaces. In certain embodiments, the decomposition rules and/or life cycle rules may be associated with a teamspace template by being associated with a teamspace template embedded database. In certain embodiments, the decomposition rules and/or life cycle rules may be associated with a teamspace by being associated with a teamspace embedded database.

Figure 14:
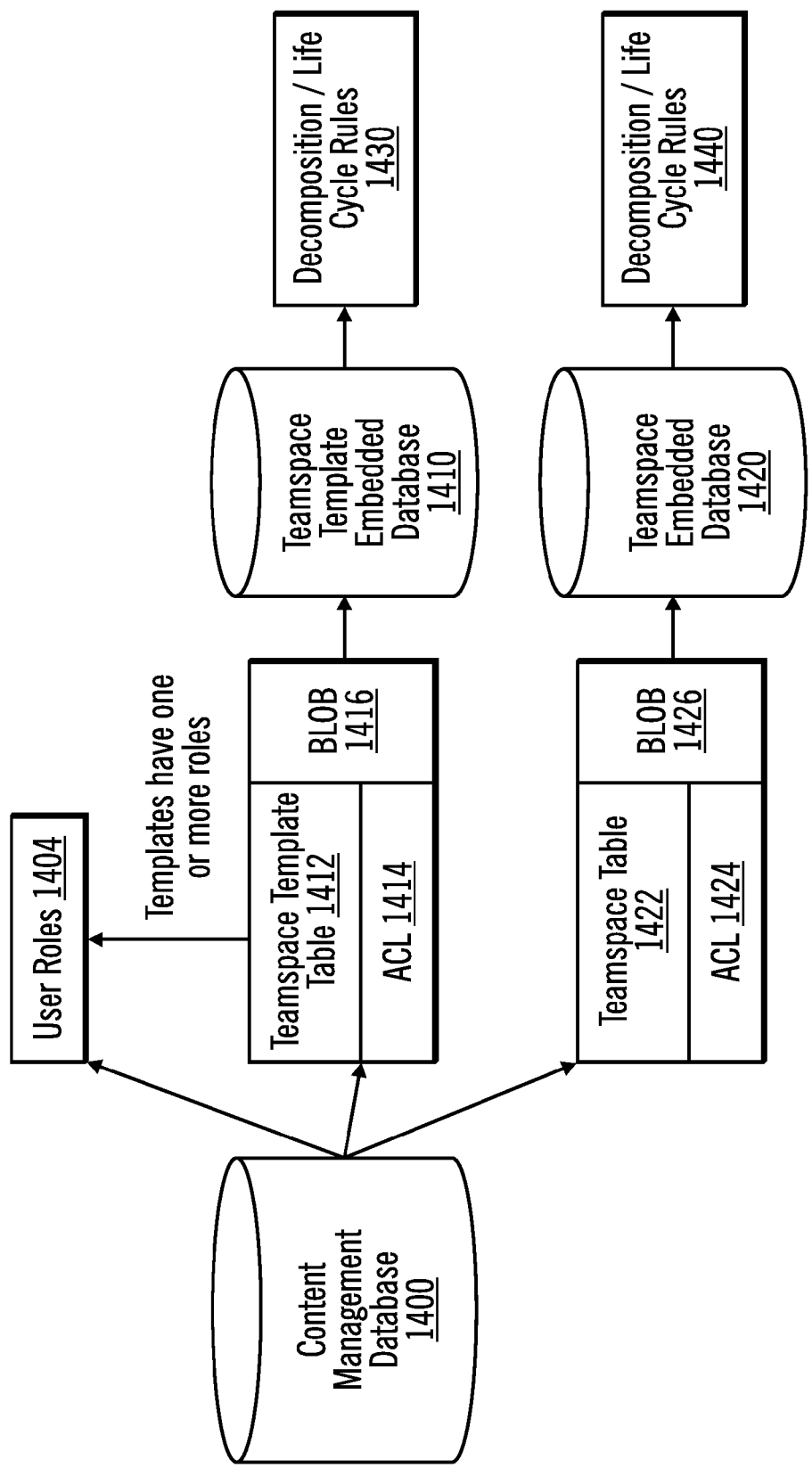
FIG. 14 illustrates teamspace templates with decomposition rules and life cycle rules in accordance with certain embodiments.

FIG. 14 illustrates teamspace templates with decomposition rules and life cycle rules in accordance with certain embodiments. In FIG. 14, a content management database 1400 stores user roles 1404, a teamspace template table 1412, and a teamspace table 1422. The teamspace template table is associated with an ACL 1414 and a BLOB 1416 to form a teamspace template embedded database 1410, which is associated with decomposition rules and life cycle rules 1420. The teamspace table 1422 is associated with an ACL 1424 and a BLOB 1426 to form a teamspace embedded database 1420, which is associated with decomposition rules and life cycle rules 1430.

FIG. 14 illustrates how teamspaces are stored in the content management database 1400. Teamspace templates 1412, 1422 may be described as file based databases that store properties that are used to create the teamspace. The teamspace templates 1412, 1422 may also store the decomposition rules and life cycle actions of a teamspace. In certain embodiments, the decomposition and life cycle rules 1410, 1420 that are applied to the teamspace instance are applied all artifacts that are added to the teamspace.

Figure 15:
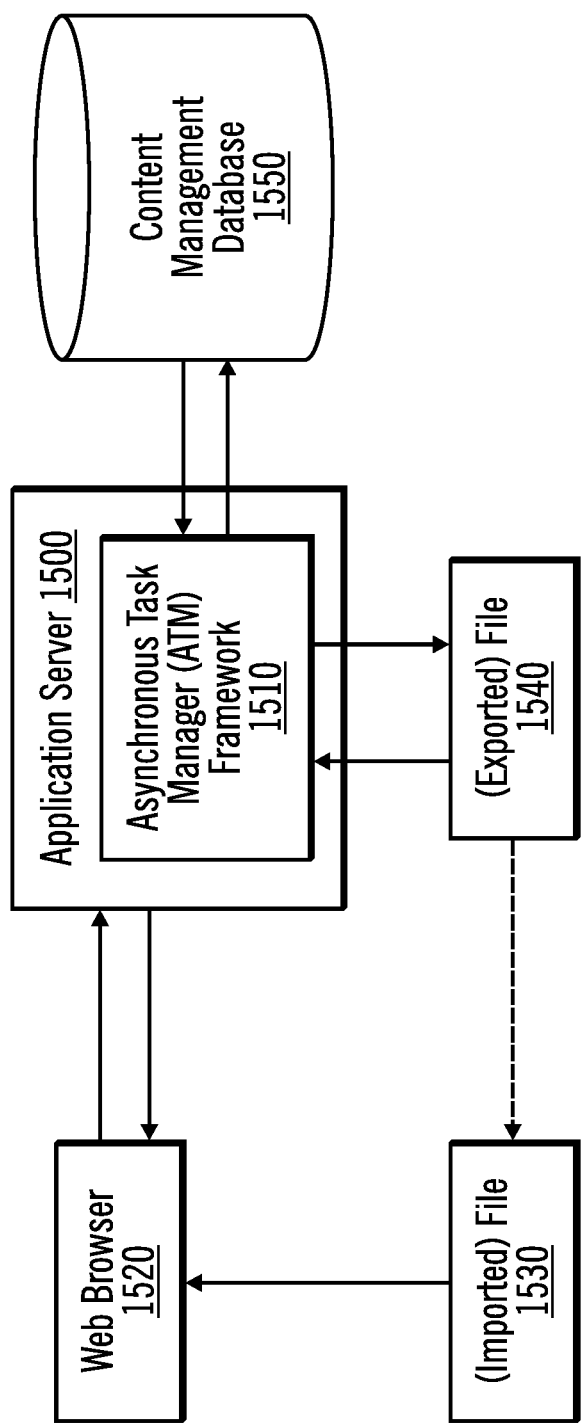
FIG. 15 illustrates an import/export framework of teamspaces and teamspace teamplates in accordance with certain embodiments.

FIG. 15 illustrates an import/export framework of teamspaces and teamspace teamplates in accordance with certain embodiments. For the export use case, the user makes a batch request to export one or many teamspaces (e.g., teamspace instances) and/or teamspace templates. The application server 1500 (which is an example of server computing device 150) receives the request, and forwards the request to an Asynchronous Task Manager (ATM) framework 1510, which is able to process asynchronous operations inside the server application 1500. In certain embodiments, the server application 1500 is a web application server (also referred to as a web container). The ATM framework 1510 makes requests to the content management database 1550 (which is an example of content management database 182) to retrieve the metadata and the teamspace template embedded database for each teamspace template to be exported and/or the artifacts (e.g., documents and folders) and the teamspace embedded database for each teamspace to be exported. In certain embodiments, the metadata describes the teamspace or teamspace template and includes, for example, the teamspace name, teamspace template name, description of the teamspace, description of the teamspace template, etc. In certain embodiments, the teamspace embedded database and the teamspace template embedded database are retrieved from the BLOB field. Once the ATM framework 1510 receives the information needed (e.g., the metadata, the teamspace template embedded database, the artifacts, and/or the teamspace embedded database) the ATM framework 1510 builds an (exported) file 1540. The file 1540 is then return to the client computing device, and the user may use the file as an (imported) file to import the teamspace and/or teamspace template into another content management database.

For the case of import, the user submits an (imported) file 1530 to the application server 1500. A service running on the application server 1500 accepts the file 1530 and parses the data in the file 1530. In certain embodiments, parsing the data in the file 1530 identifies the metadata, embedded database, artifact, etc. in the file. In certain embodiments, the service also performs validation when parsing the data in the file 1530 to ensure that the file contains the information needed for the teamspace and/or teamspace template. For a teamspace template that is being imported, the service invokes the create teamspace action with the data read from the file 1530. The create teamspace action creates each teamspace that is in the file 1530. Also, for a teamspace that is being imported, the service generates a folder structure and imports documents that are included in the teamspace that is being imported.

In various embodiments, the imported file 1530 and/or the exported file 1540 may be JavaScript Object Notation (JSON) files.

Figure 16:
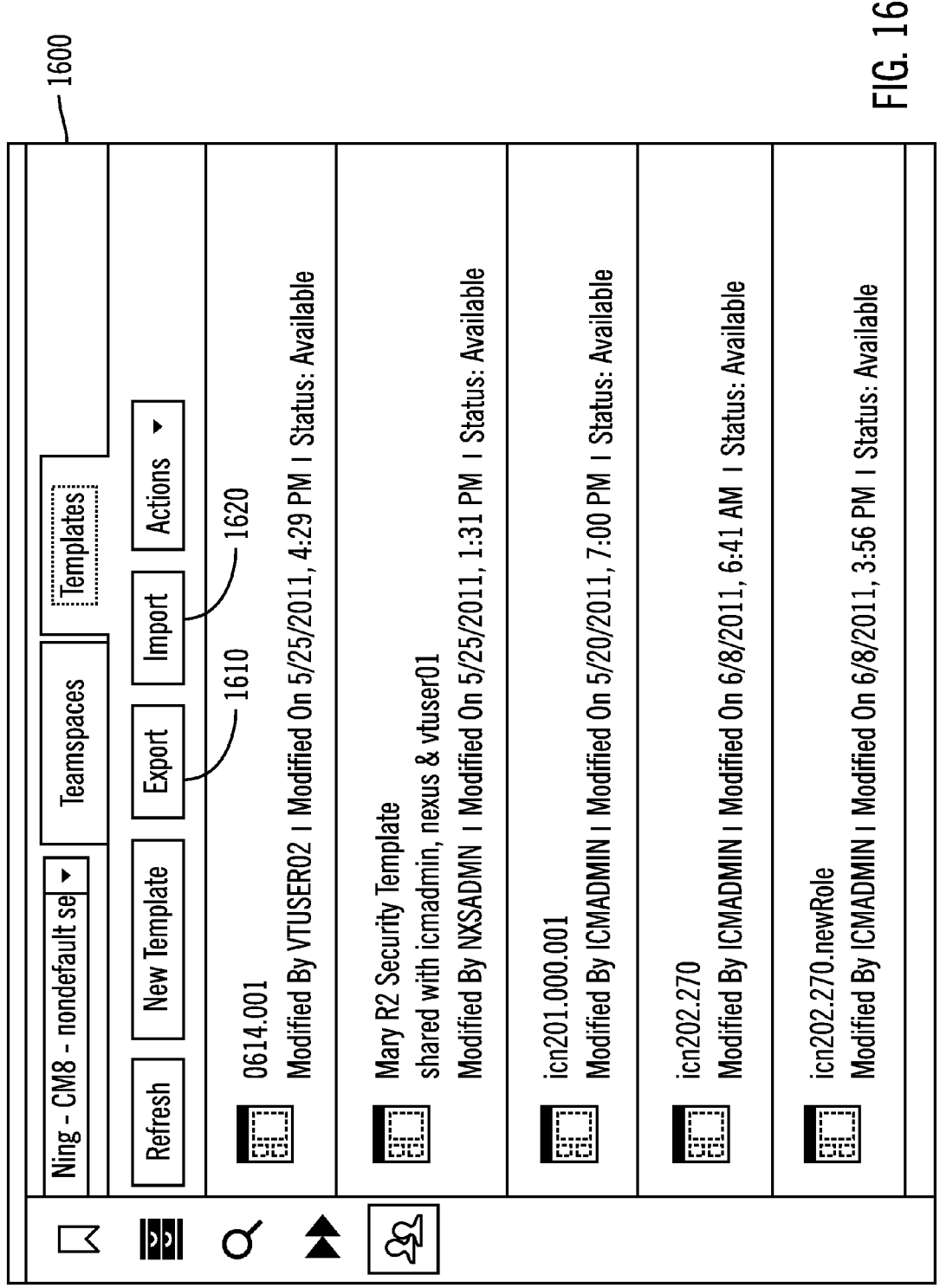
FIG. 16 illustrates a user interface with a list of teamspace templates, an export button, and an import button in accordance with certain embodiments.

FIG. 16 illustrates a user interface 1600 with a list of teamspace templates, an export button 1610, and an import button 1620 in accordance with certain embodiments.

Figure 17:
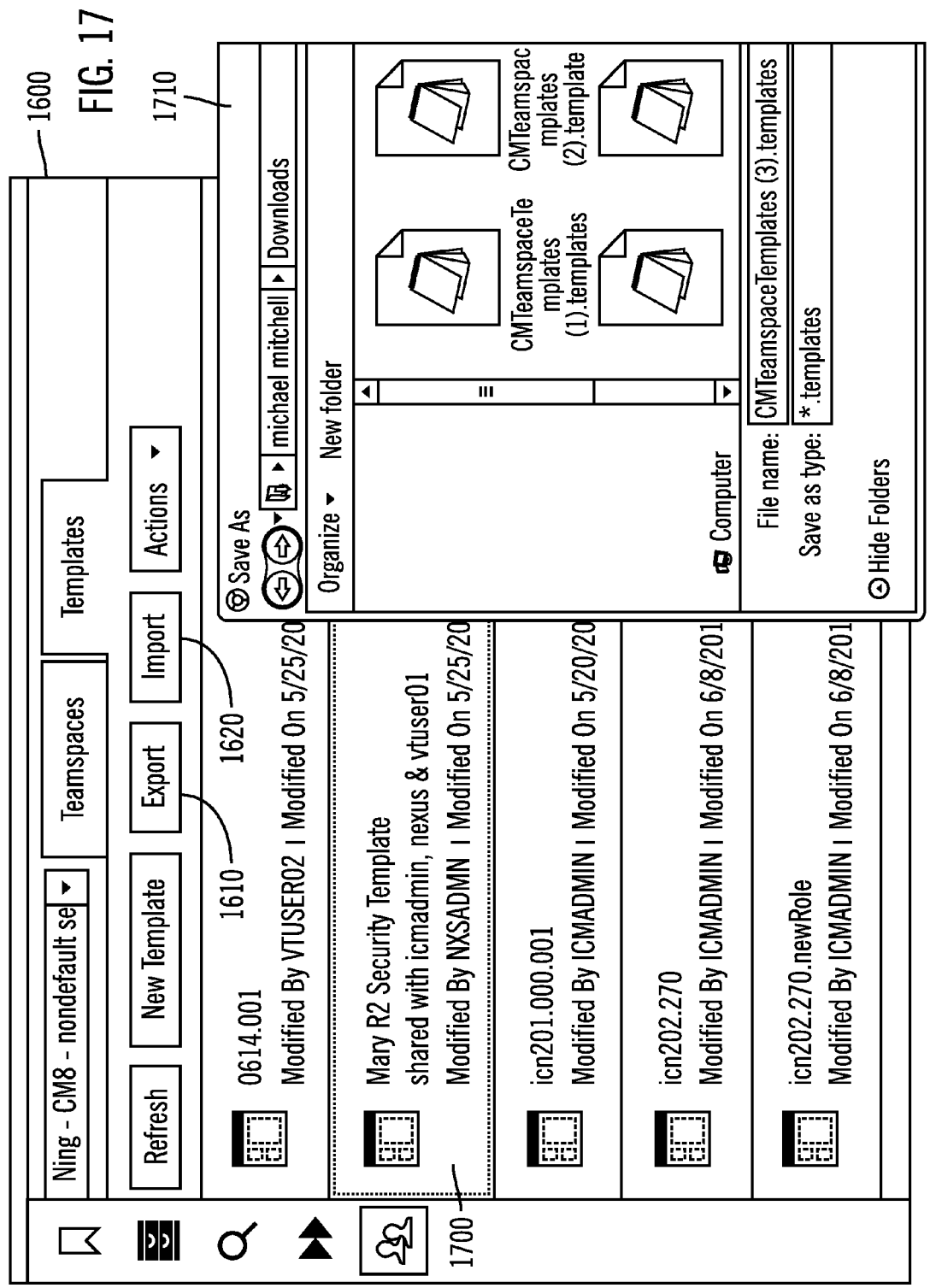
FIG. 17 illustrates a user interface with a teamspace template and an export button 1610 selected in accordance with certain embodiments.

FIG. 17 illustrates the user interface 1600 with a teamspace template 1710 and the export button 1610 selected in accordance with certain embodiments. In response to selection of the export button 1610, embodiments provide a pop-up 1710 to allow a user to select a location and name for saving the exported file. Then, the selected teamspace template is exported as that file.

In certain embodiments, the exported file may contain: 1) a teamspace, 2) a teamspace template or 3) both the teamspace and the teamspace template.

Figure 18:
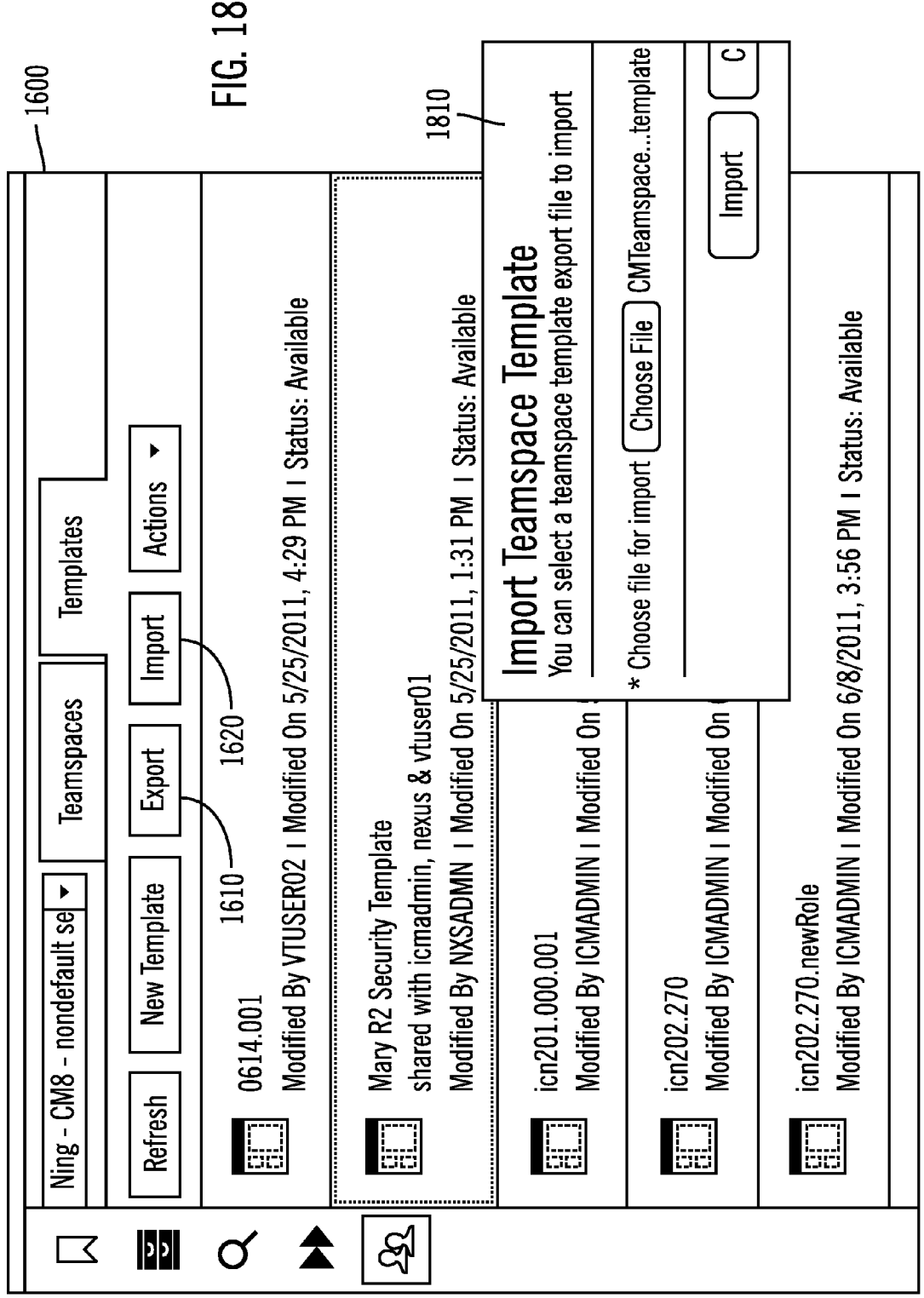
FIG. 18 illustrates a user interface with an import button selected in accordance with certain embodiments.

FIG. 18 illustrates the user interface 1600 with the import button 1620 selected in accordance with certain embodiments. In response to the import button 1620 being selected, embodiments provide pop-up 1810 to allow a user to select a file to be imported. In certain embodiments, the file being imported is one that was previously exported. In certain embodiments, the imported file may contain: 1) a teamspace, 2) a teamspace template or 3) both the teamspace and the teamspace template.

FIG. 19 illustrates the user interface 1600 after a file has been imported in accordance with certain embodiments. The user interface 1600 now shows the imported file 1900, along with a "requires validation" state 1910. In certain embodiments, after a teamspace or teamspace template has been imported, the teamspace or teamspace template is in the "requires validation" state until the teamspace or teamspace template is opened and validated with the teamspace template builder.

Figure 20:
FIG. 20 illustrates a user interface for a teamspace template builder for validating an imported file in accordance with certain embodiments.

FIG. 20 illustrates a user interface 2000 for a teamspace template builder for validating an imported file in accordance with certain embodiments. The imported file is opened in with the teamspace template builder. The user selects the validate button to save the imported file to the "publish" state. Once in the "publish" state, the imported file may be used to create a teamspace instance.

Figure 21:
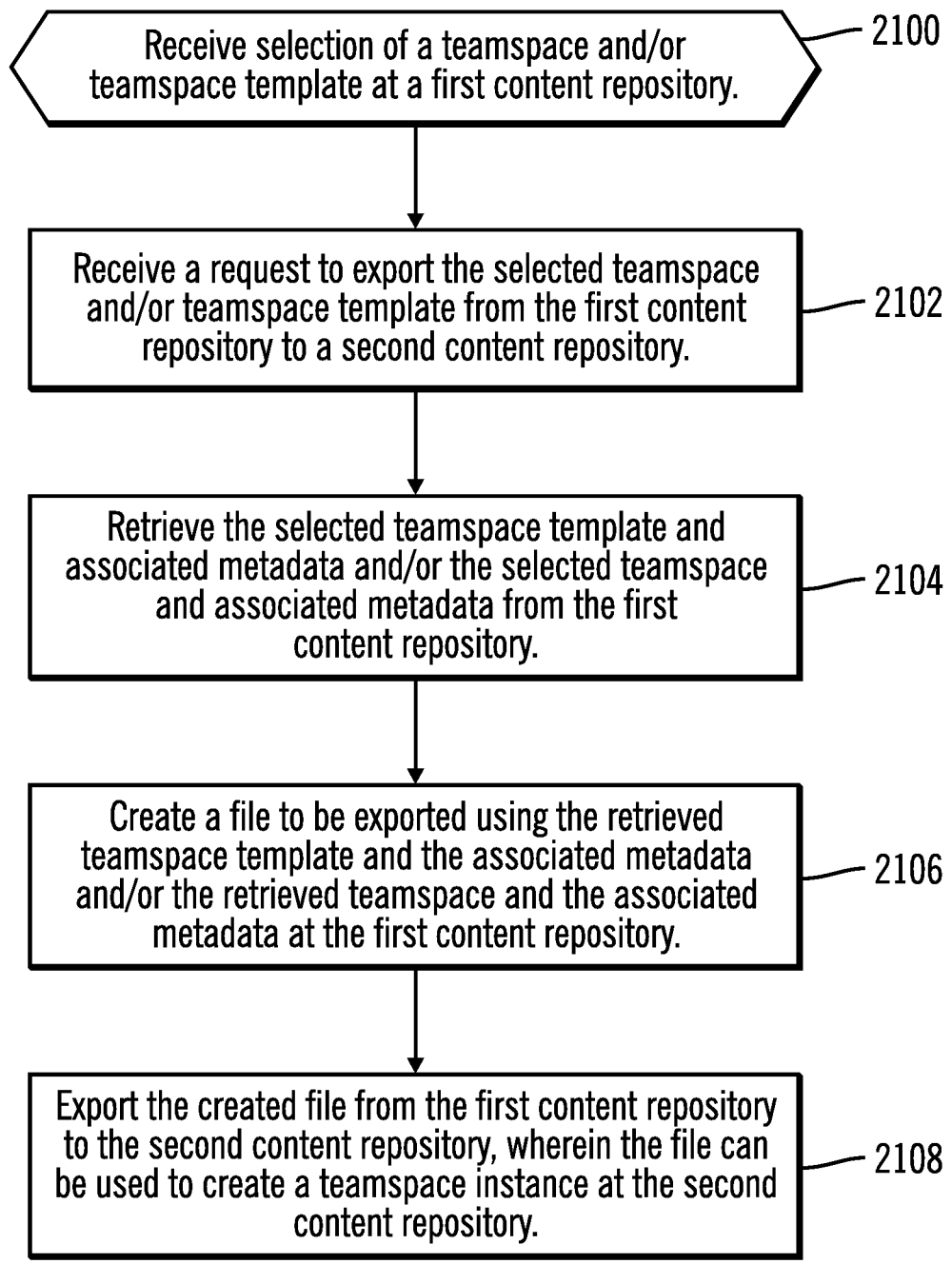
FIG. 21 illustrates in a flow diagram, operations to export a teamspace and/or a teamspace template in accordance with certain embodiments.

FIG. 21 illustrates in a flow diagram, operations to export a teamspace and/or teamspace template in accordance with certain embodiments. Control begins at block 2100 with the self-provisioning system 110a receiving selection of a teamspace and/or a teamspace template at a first content repository. In block 2102, the self-provisioning system 110a receives a request to export the selected teamspace and/or teamspace template from the first content repository to a second content repository. In block 2104, the self-provisioning system 110a retrieves the selected teamspace template and associated metadata and/or the selected teamspace and associated metadata from the first content repository. In block 2106, the self-provisioning system 110a creates a file to be exported using the retrieved teamspace template and the associated metadata and/or the retrieved teamspace and the associated metadata at the first content repository. In block 2108, the self-provisioning system 110a exports the created file from the first content repository to the second content repository, wherein the file can be used to create a teamspace instance at the second content repository. In certain embodiments, the created file is exported by being saved at the first content repository, the second content repository, or another content repository.

Figure 22:
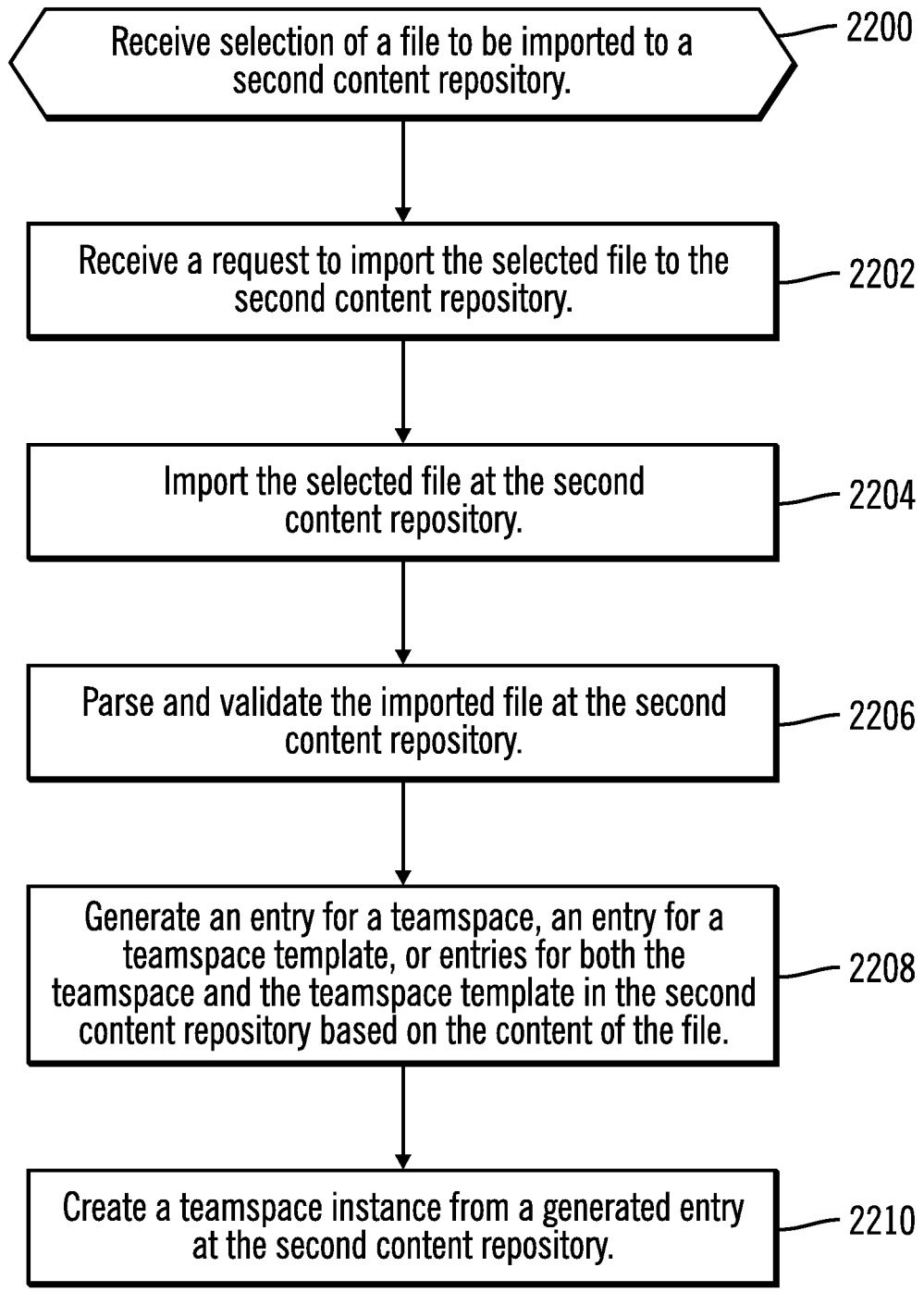
FIG. 22 illustrates, in a flow diagram, operations to import a teamspace and/or a teamspace template in accordance with certain embodiments.

FIG. 22 illustrates, in a flow diagram, operations to import a teamspace and/or a teamspace template in accordance with certain embodiments. Control begins at block 2200 with the self-provisioning system 110a receiving selection of a file to be imported to a second content repository. In block 2202, the provisioning system 110a receives a request to import the selected file to the second content repository. In block 2204, the provisioning system 110a imports the selected file at the second content repository. In certain embodiments, the provisioning system 110 imports the selected file by reading the file into memory (e.g., from the second content repository). In block 2206, the provisioning system 110a parses and validates the imported file at the second content repository. In block 2208, the provisioning system 110a generates an entry for a teamspace, an entry for a teamspace template, or entries for both the teamspace and the teamspace template in the second content repository based on the content of the file. In block 2210, the provisioning system 110a creates a teamspace instance from a generated entry at the second content repository.

That is, the file may contain content for a teamspace, a teamspace template or both. In various embodiments, the file contains content for multiple teamspaces and/or teamspace templates. FIG. 4 illustrates a table 400 for a teamspace template or a teamspace and shows the type of entries that may be created at the second content repository that is importing the teamspace template and/or teamspace. The parsed and validated data of the imported file may be used to create such an entry, with a name of the teamspace or teamspace template obtained from the metadata, a description obtained from the metadata, a BLOB for the teamspace template (e.g., an embedded database), and a state (e.g., requires validation, offline, published, deleted, archived, etc.) obtained from the metadata. Then, a new teamspace instance may be created from the entry for the teamspace template in the second content repository. In addition, a new teamspace instance may be created from the entry for the teamspace in the second content repository.

Once the entries are created, when a teamspace template is used to create a teamspace, a copy of the teamspace template embedded database is retrieved from the entry and used to create the teamspace embedded database. In certain embodiments, the teamspace template embedded database provided by the teamspace template is the base for what is generated to create the teamspace instance. A teamspace may extend or change certain aspects of the teamspace template embedded database provided by the teamspace template, but the teamspace uses the teamspace template embedded database as the starting point. The teamspace template embedded database provides the roles that are used to apply the role-based security on the teamspace instance, and the teamspace template also contains the role definitions.

Similarly, the decomposition rules and/or lifecycle rules associated with the teamspace template embedded database and the teamspace embedded database are applied to the teamspace instance. With embodiments, teamspace templates may contain policy guidelines for areas such as, life cycle actions, how project areas are decommissioned, etc. When these policies are revised, the new policies may be applied not only to subsequently-created teamspaces, but also retroactively to existing teamspaces, built from that template. Policy guidelines may include how artifacts managed in a teamspace are reviewed and approved by teamspace role members. In addition, embodiments allow teamspaces and/or teamspace templates to be exported and imported from one content repository to another content repository.

Embodiments enable migration, archival, and disposition of teamspaces and teamspace templates.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 23:
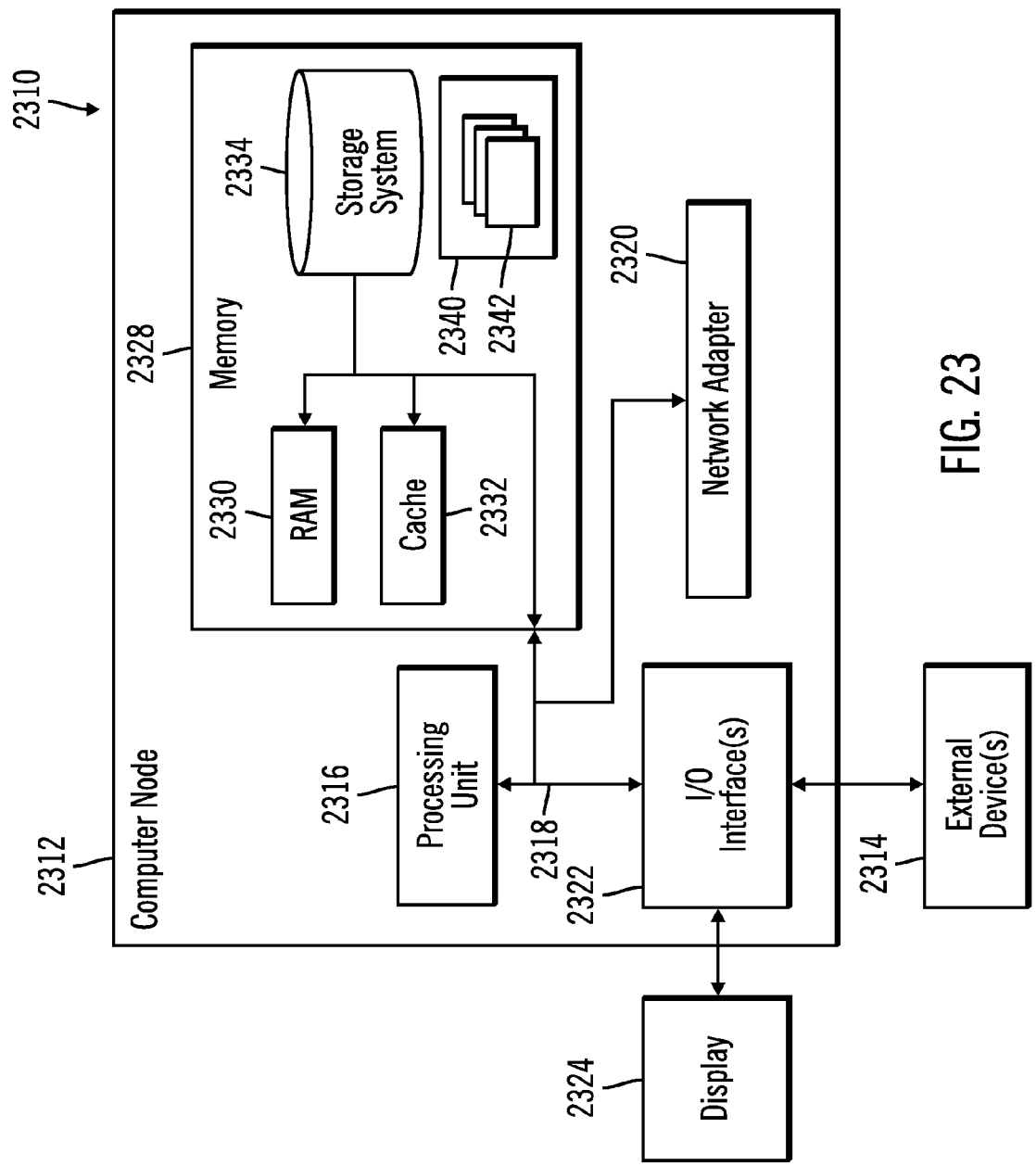
FIG. 23 illustrates a cloud computing node in accordance with certain embodiments.

Referring now to FIG. 23, a schematic of an example of a cloud computing node is shown. Cloud computing node 2310 is only one example of a suitable cloud computing node and is not intended to suggest any limitation as to the scope of use or functionality of embodiments of the invention described herein. Regardless, cloud computing node 2310 is capable of being implemented and/or performing any of the functionality set forth hereinabove.

In cloud computing node 2310 there is a computer system/server 2312, which is operational with numerous other general purpose or special purpose computing system environments or configurations. Examples of well-known computing systems, environments, and/or configurations that may be suitable for use with computer system/server 2312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 2312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 23, computer system/server 2312 in cloud computing node 2310 is shown in the form of a general-purpose computing device. The components of computer system/server 2312 may include, but are not limited to, one or more processors or processing units 2316, a system memory 2328, and a bus 2318 that couples various system components including system memory 2328 to a processor or processing unit 2316.

Bus 2318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2312 typically includes a variety of computer system readable media. Such media may be any available media that is accessible by computer system/server 2312, and it includes both volatile and non-volatile media, removable and non-removable media.

System memory 2328 can include computer system readable media in the form of volatile memory, such as random access memory (RAM) 2330 and/or cache memory 2332. Computer system/server 2312 may further include other removable/non-removable, volatile/non-volatile computer system storage media. By way of example only, storage system 2334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2318 by one or more data media interfaces. As will be further depicted and described below, memory 2328 may include at least one program product having a set (e.g., at least one) of program modules that are configured to carry out the functions of embodiments of the invention.

Program/utility 2340, having a set (at least one) of program modules 2342, may be stored in memory 2328 by way of example, and not limitation, as well as an operating system, one or more application programs, other program modules, and program data. Each of the operating system, one or more application programs, other program modules, and program data or some combination thereof, may include an implementation of a networking environment. Program modules 2342 generally carry out the functions and/or methodologies of embodiments of the invention as described herein.

Computer system/server 2312 may also communicate with one or more external devices 2314 such as a keyboard, a pointing device, a display 2324, etc.; one or more devices that enable a user to interact with computer system/server 2312; and/or any devices (e.g., network card, modem, etc.)

that enable computer system/server 2312 to communicate with one or more other computing devices. Such communication can occur via Input/Output (I/O) interfaces 2322. Still yet, computer system/server 2312 can communicate with one or more networks such as a local area network (LAN), a general wide area network (WAN), and/or a public network (e.g., the Internet) via network adapter 2320. As depicted, network adapter 2320 communicates with the other components of computer system/server 2312 via bus 2318. It should be understood that although not shown, other hardware and/or software components could be used in conjunction with computer system/server 2312. Examples, include, but are not limited to: microcode, device drivers, redundant processing units, external disk drive arrays, RAID systems, tape drives, and data archival storage systems, etc.

Figure 24:
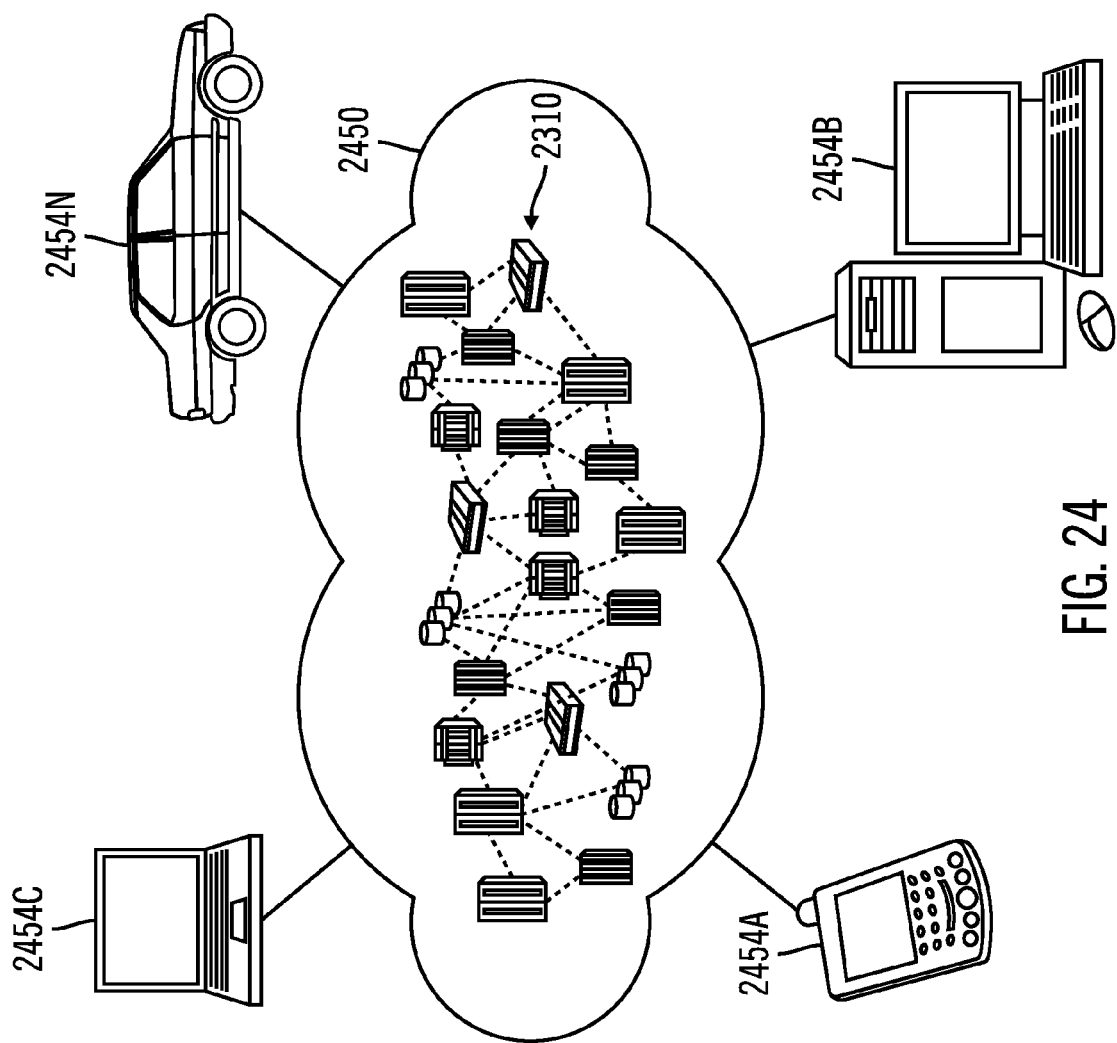
FIG. 24 illustrates a cloud computing environment in accordance with certain embodiments.

Referring now to FIG. 24, illustrative cloud computing environment 2450 is depicted. As shown, cloud computing environment 2450 comprises one or more cloud computing nodes 2310 with which local computing devices used by cloud consumers, such as, for example, personal digital assistant (PDA) or cellular telephone 2454A, desktop computer 2454B, laptop computer 2454C, and/or automobile computer system 2454N may communicate. Nodes 2310 may communicate with one another. They may be grouped (not shown) physically or virtually, in one or more networks, such as Private, Community, Public, or Hybrid clouds as described hereinabove, or a combination thereof. This allows cloud computing environment 2450 to offer infrastructure, platforms and/or software as services for which a cloud consumer does not need to maintain resources on a local computing device. It is understood that the types of computing devices 2454A-N shown in FIG. 24 are intended to be illustrative only and that computing nodes 2310 and cloud computing environment 2450 can communicate with any type of computerized device over any type of network and/or network addressable connection (e.g., using a web browser).

Figure 25:
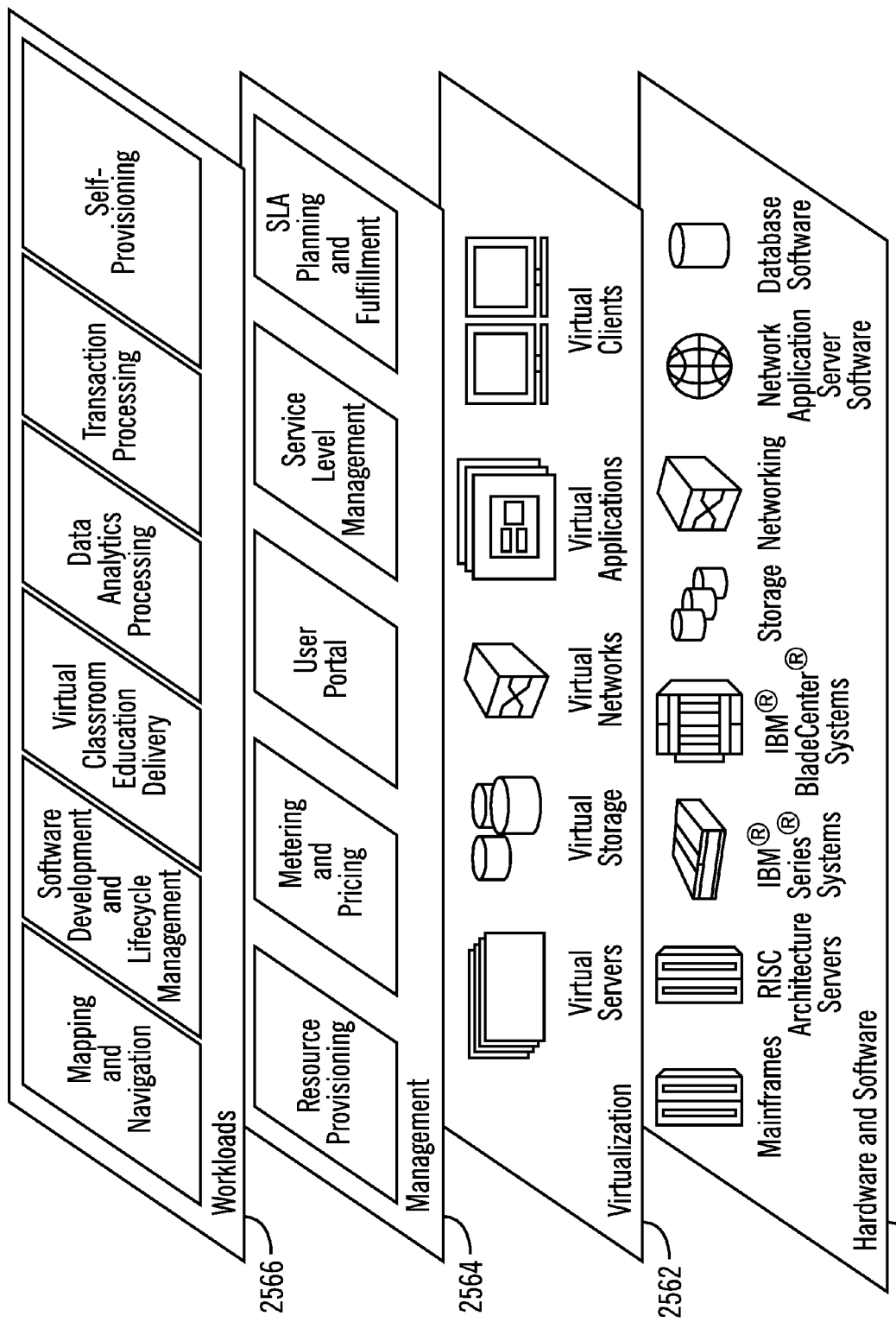
FIG. 25 illustrates abstraction model layers in accordance with certain embodiments.

Referring now to FIG. 25, a set of functional abstraction layers provided by cloud computing environment 2450 (FIG. 24) is shown. It should be understood in advance that the components, layers, and functions shown in FIG. 25 are intended to be illustrative only and embodiments of the invention are not limited thereto. As depicted, the following layers and corresponding functions are provided:

Hardware and software layer 2560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2562 provides an abstraction layer from which the following examples of virtual entities may be provided: virtual servers; virtual storage; virtual networks, including virtual private networks; virtual applications and operating systems; and virtual clients.

In one example, management layer 2564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 2566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and self-provisioning.

Thus, in certain embodiments, software or a program, implementing self-provisioning in accordance with embodiments described herein, is provided as a service in a cloud environment.

In certain embodiments, the client computing device 100 and/or the server computing device 150 have the architecture of computing node 2310. In certain embodiments, the client computing device 100 and/or the server computing device 150 is part of a cloud environment. In certain alternative embodiments, the client computing device 100 and/or the server computing device 150 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
    generating, using a processor of a computer, a teamspace template from a teamspace template embedded database having associated rules;
    creating a file using the teamspace template and associated metadata at a first content repository; and
    exporting the file from the first content repository to a second content repository to be parsed and validated, wherein the file can be used to create a teamspace instance that inherits the associated rules at the second content repository.

2. The method of claim 1, further comprising:
    importing the file at the second content repository to generate an entry for the teamspace template in the second content repository; and
    creating the teamspace instance from the entry for the teamspace template at the second content repository.

3. The method of claim 2, wherein the associated rules include a decomposition rule and a life cycle rule.

4. The method of claim 1, further comprising:
    creating a new file using a teamspace, associated metadata, and at least one artifact at the first content repository; and
    exporting the new file from the first content repository to the second content repository, wherein the new file can be used to create a new teamspace instance at the second content repository.

5. The method of claim 4, further comprising:
    importing the new file at the second content repository to generate an entry for the teamspace in the second content repository; and
    creating the new teamspace instance from the entry for the teamspace at the second content repository.

6. The method of claim 5, wherein a decomposition rule and a life cycle rule are associated with the teamspace, and wherein the created new teamspace instance inherits the decomposition rule and the life cycle rule.

7. The method of claim 1, further comprising:
    receiving a batch request to export the teamspace template and a teamspace; and
    exporting the teamspace template and the teamspace from the first content repository to the second content repository asynchronously.

8. The method of claim 1, wherein a Software as a Service (SaaS) is configured to perform method operations.

9. A computer program product, the computer program product comprising:
    a non-transitory computer readable storage medium having program code embodied therewith, the program code executable by at least one processor to perform:
    generating a teamspace template from a teamspace template embedded database having associated rules;
    creating a file using the teamspace template and associated metadata at a first content repository; and
    exporting the file from the first content repository to a second content repository to be parsed and validated, wherein the file can be used to create a teamspace instance that inherits the associated rules at the second content repository.

10. The computer program product of claim 9, wherein the program code is executable by the at least one processor to perform:
    importing the file at the second content repository to generate an entry for the teamspace template in the second content repository; and
    creating the teamspace instance from the entry for the teamspace template at the second content repository.

11. The computer program product of claim 10, wherein the associated rules include a decomposition rule and a life cycle rule.

12. The computer program product of claim 11, wherein the program code is executable by the at least one processor to perform:

creating a new file using a teamspace, associated metadata, and at least one artifact at the first content repository; and exporting the new file from the first content repository to the second content repository, wherein the new file can be used to create a new teamspace instance at the second content repository.

13. The computer program product of claim 12, wherein the program code is executable by the at least one processor to perform:

importing the new file at the second content repository to generate an entry for the teamspace in the second content repository; and creating the new teamspace instance from the entry for the teamspace at the second content repository.

14. The computer program product of claim 13, wherein a decomposition rule and a life cycle rule are associated with the teamspace, and wherein the created new teamspace instance inherits the decomposition rule and the life cycle rule.

15. The computer program product of claim 9, wherein the program code is executable by the at least one processor to perform:

receiving a batch request to export the teamspace template and a teamspace; and exporting the teamspace template and the teamspace from the first content repository to the second content repository asynchronously.

16. The computer program product of claim 9, wherein a Software as a Service (SaaS) is configured to perform computer program product operations.

17. A computer system, comprising:

a processor; and a storage device connected to the processor, wherein the storage device has stored thereon a program, wherein the processor is configured to execute instructions of the program to perform operations, and wherein the operations comprise:

generating a teamspace template from a teamspace template embedded database having associated rules;

creating a file using the teamspace template and associated metadata at a first content repository; and exporting the file from the first content repository to a second content repository to be parsed and validated, wherein the file can be used to create a teamspace instance that inherits the associated rules at the second content repository.

18. The computer system of claim 17, wherein the operations further comprise:

importing the file at the second content repository to generate an entry for the teamspace template in the second content repository; and creating the teamspace instance from the entry for the teamspace template at the second content repository.

19. The computer system of claim 18, wherein the associated rules include a decomposition rule and a life cycle rule.

20. The computer system of claim 17, wherein a Software as a Service (SaaS) is provided to perform system operations.

* * * * *